(12) United States Patent
Kim et al.

(10) Patent No.: US 10,591,219 B2
(45) Date of Patent: Mar. 17, 2020

(54) HEAT RECOVERY APPARATUS

(71) Applicant: LG CHEM, LTD., Seoul (KR)

(72) Inventors: Tae Woo Kim, Daejeon (KR); Sung Kyu Lee, Daejeon (KR); Joon Ho Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 104 days.

(21) Appl. No.: 15/573,331

(22) PCT Filed: Jun. 17, 2016

(86) PCT No.: PCT/KR2016/006462
§ 371 (c)(1),
(2) Date: Nov. 10, 2017

(87) PCT Pub. No.: WO2016/204560
PCT Pub. Date: Dec. 22, 2016

(65) Prior Publication Data
US 2018/0135914 A1    May 17, 2018

(30) Foreign Application Priority Data
Jun. 18, 2015  (KR) .................. 10-2015-0086501

(51) Int. Cl.
| | |
|---|---|
| *F28C 3/04* | (2006.01) |
| *F25B 27/02* | (2006.01) |
| *F25B 5/00* | (2006.01) |
| *F25B 30/02* | (2006.01) |
| *F25B 13/00* | (2006.01) |
| *F25B 25/00* | (2006.01) |

(52) U.S. Cl.
CPC ............... *F28C 3/04* (2013.01); *F25B 5/00* (2013.01); *F25B 13/00* (2013.01); *F25B 27/02* (2013.01); *F25B 30/02* (2013.01); *F25B 25/005* (2013.01); *F25B 2339/047* (2013.01); *Y02A 30/274* (2018.01); *Y02P 20/123* (2015.11); *Y02P 20/124* (2015.11); *Y02P 80/156* (2015.11)

(58) Field of Classification Search
CPC .. F25B 27/02; F25B 5/02; F25B 30/02; F25B 25/00; F25B 25/005; F25B 2339/04; F25B 2341/061; F28C 3/04; Y02P 20/124; Y02P 20/123; Y02P 80/156
See application file for complete search history.

(56) References Cited

U.S. PATENT DOCUMENTS

| | | | |
|---|---|---|---|
| 4,201,058 A | 5/1980 | Vaughan | |
| 2009/0288432 A1* | 11/2009 | Lifson | ....................... F25B 5/02 62/115 |

(Continued)

FOREIGN PATENT DOCUMENTS

| | | |
|---|---|---|
| EP | 3015794 A1 | 5/2016 |
| JP | 2009-133624 A | 6/2009 |

(Continued)

*Primary Examiner* — Elizabeth J Martin
(74) *Attorney, Agent, or Firm* — Dentons US LLP

(57) ABSTRACT

The present application relates to a heat recovery apparatus and method, and according to the heat recovery apparatus and method of the present application. The heat recovery apparatus comprising a first heat exchange, a compression device, a second heat exchange device and at least two pressure drop devices, which are fluidically connected through pipes in which at least two refrigerants flow.

27 Claims, 10 Drawing Sheets

(56) References Cited

U.S. PATENT DOCUMENTS

| | | | |
|---|---|---|---|
| 2010/0319346 A1 | 12/2010 | Ast et al. | |
| 2015/0020534 A1* | 1/2015 | Zhang | F25B 41/04 62/117 |
| 2016/0187036 A1* | 6/2016 | Lee | F25B 27/00 62/98 |
| 2017/0082333 A1* | 3/2017 | Shimazu | F25B 6/04 |

FOREIGN PATENT DOCUMENTS

| | | |
|---|---|---|
| JP | 2012-127606 A | 7/2012 |
| JP | 2012-167852 A | 9/2012 |
| JP | 2012-247146 A | 12/2012 |
| JP | 2013-148330 A | 8/2013 |
| JP | 2013-151931 A | 8/2013 |
| JP | 2013-213592 A | 10/2013 |
| KR | 10-0443815 B1 | 8/2004 |
| KR | 10-0569779 A | 4/2006 |
| KR | 10-2015-0000422 A | 1/2015 |
| WO | 2014/208938 A1 | 12/2014 |

\* cited by examiner

[Figure 1]
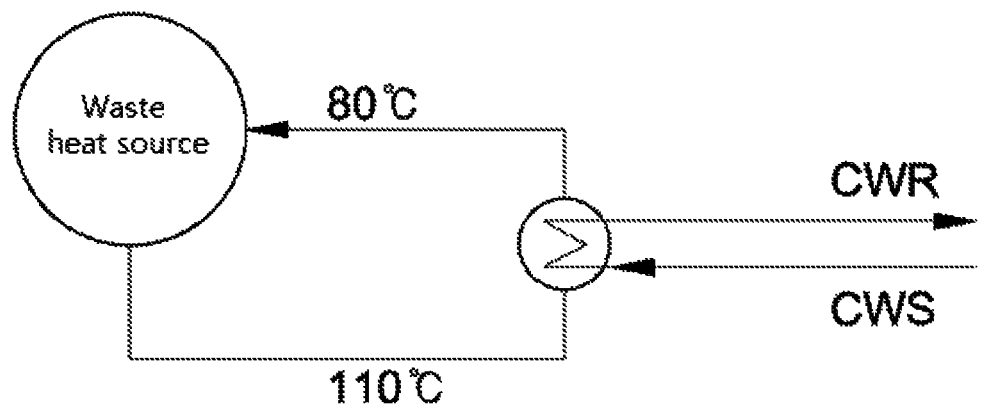
[Figure 2]
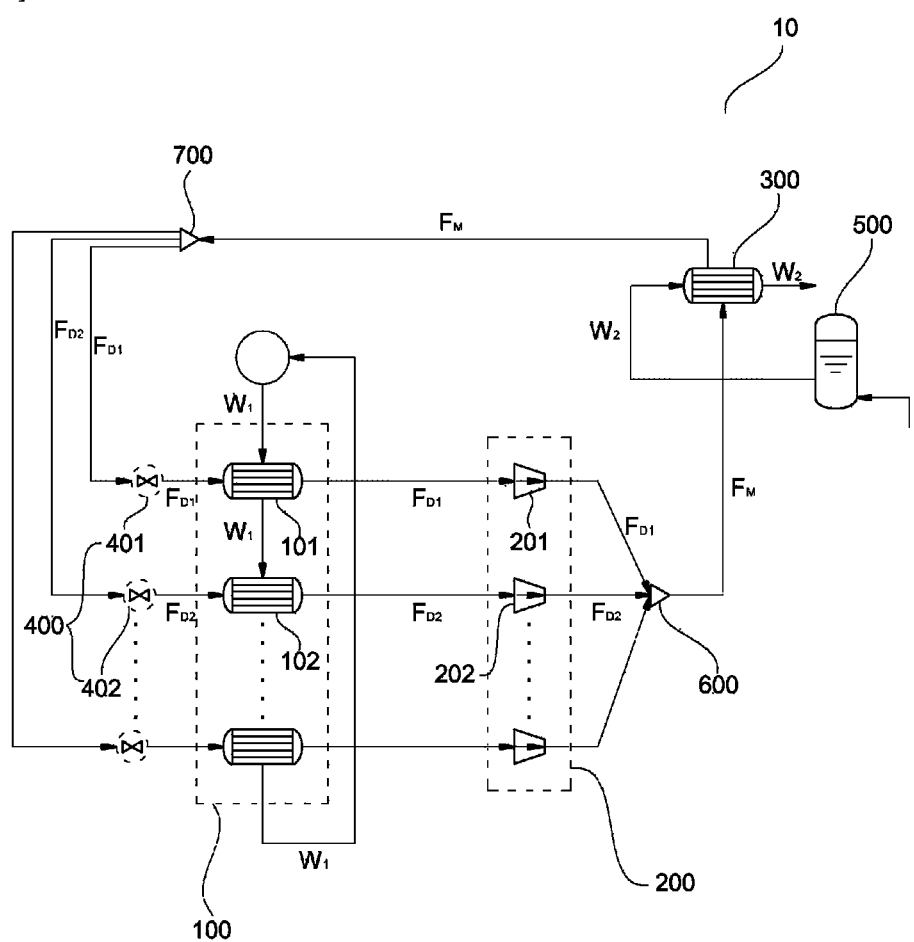

[Figure 3]
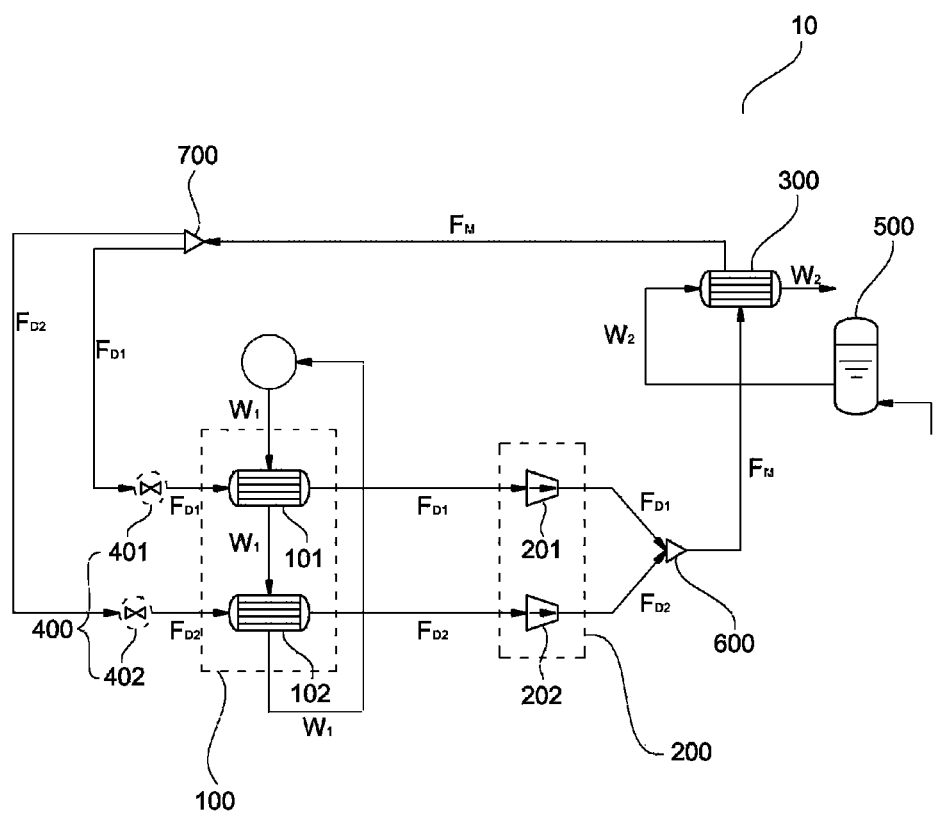

[Figure 4]
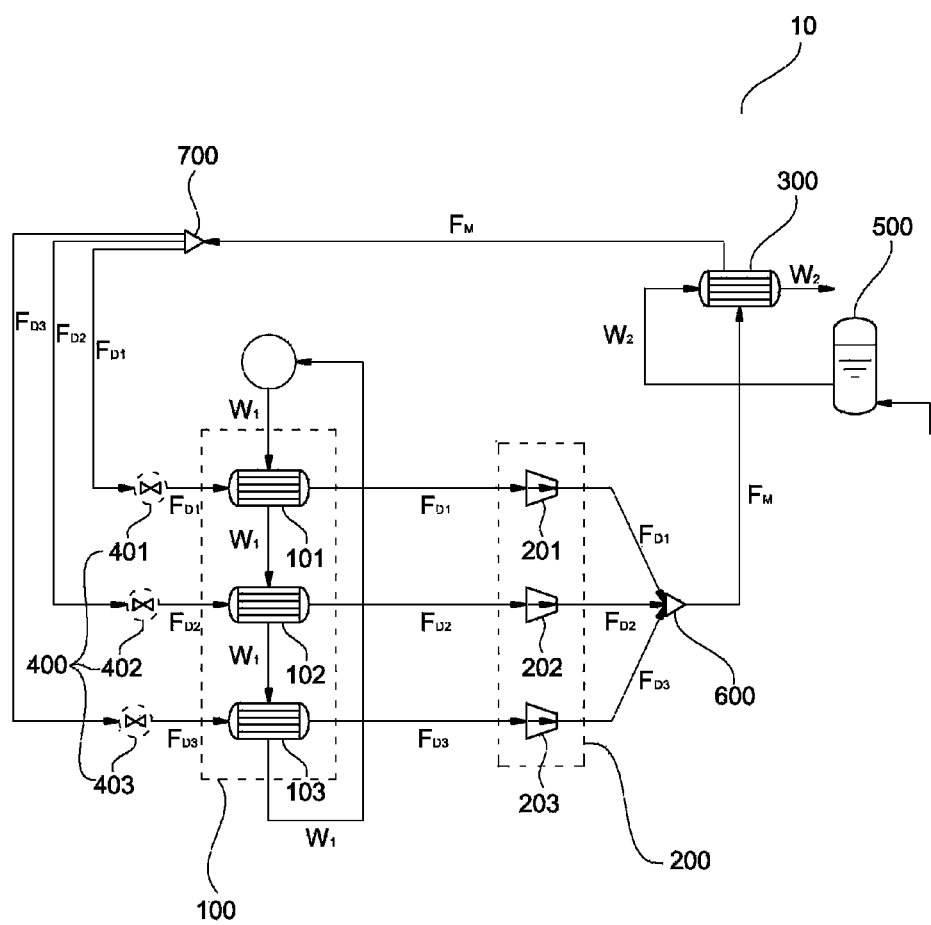

[Figure 5]
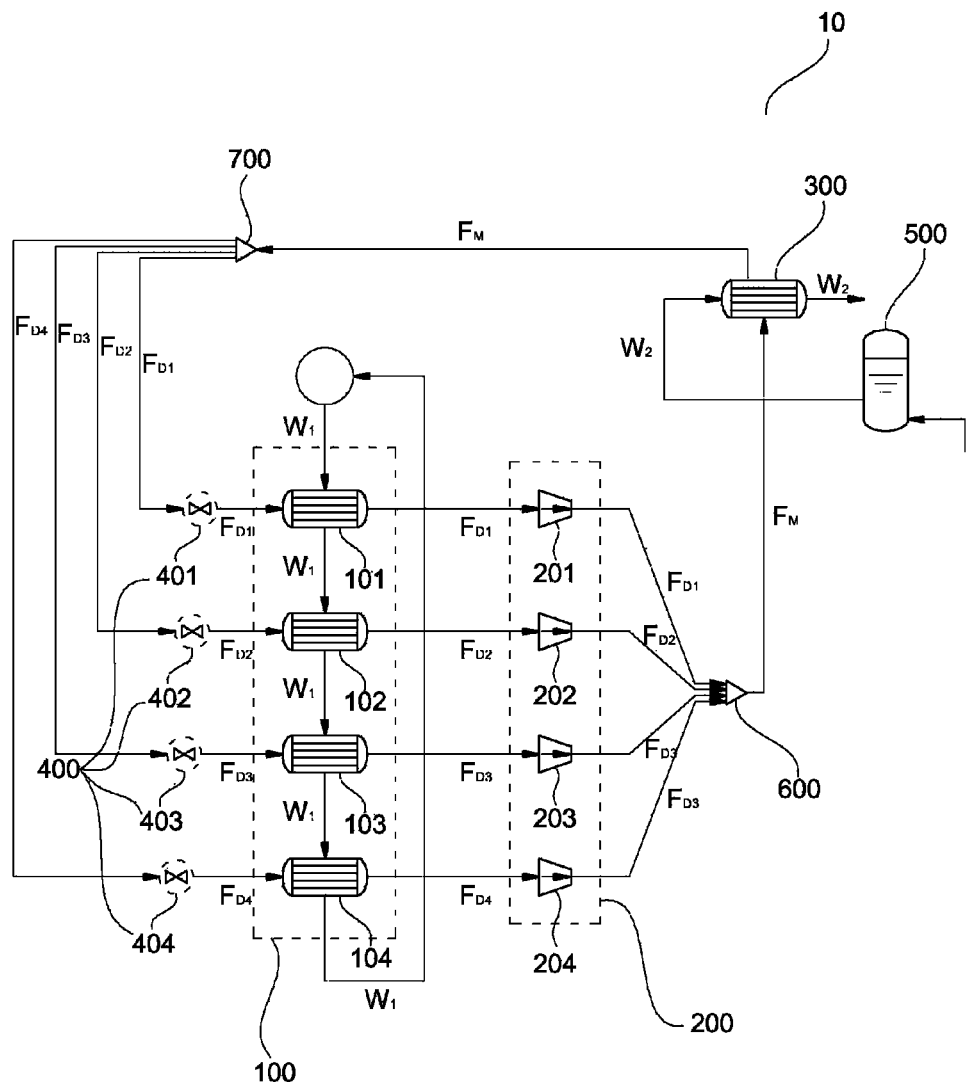

[Figure 6]
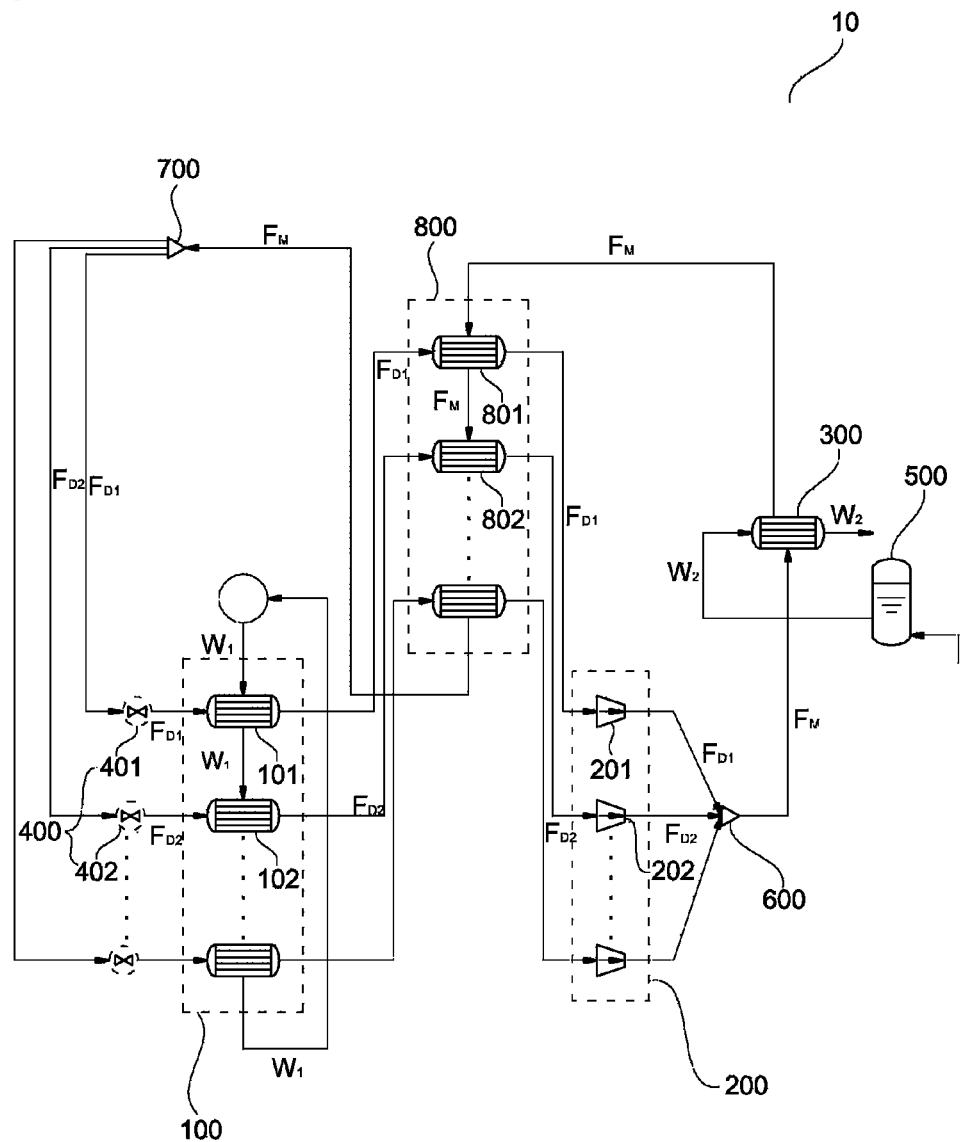

[Figure 7]
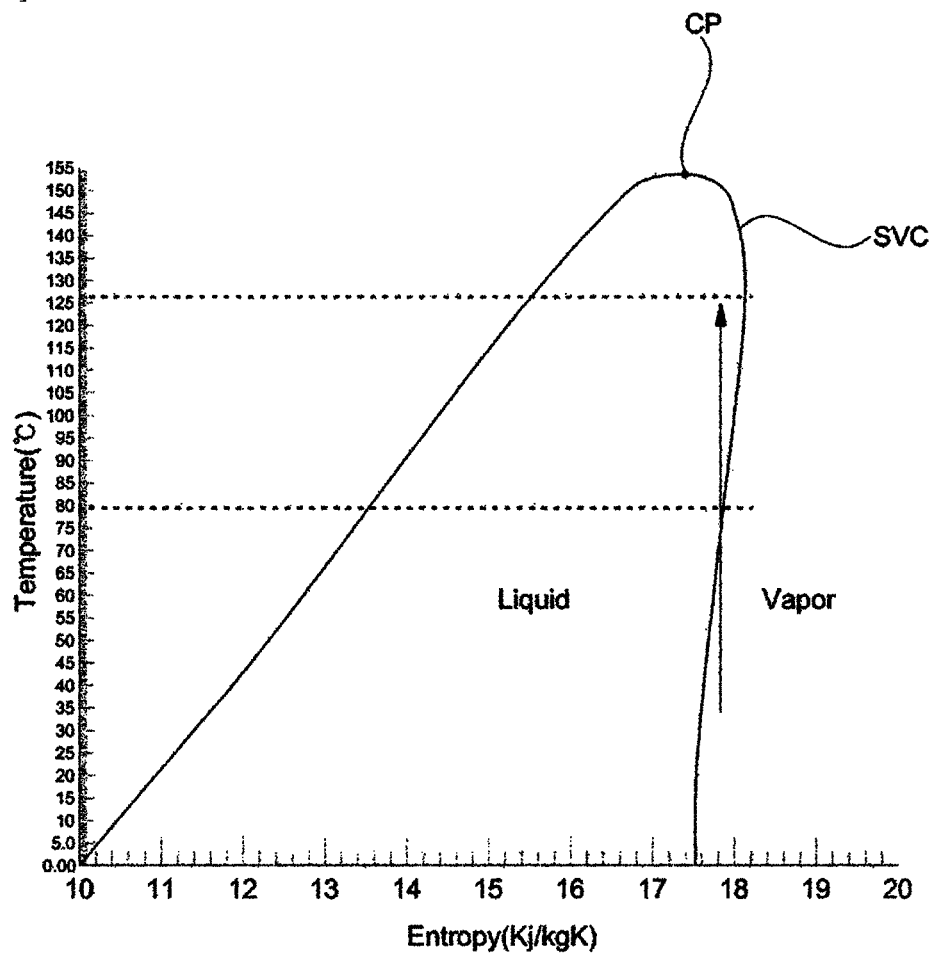

[Figure 8]
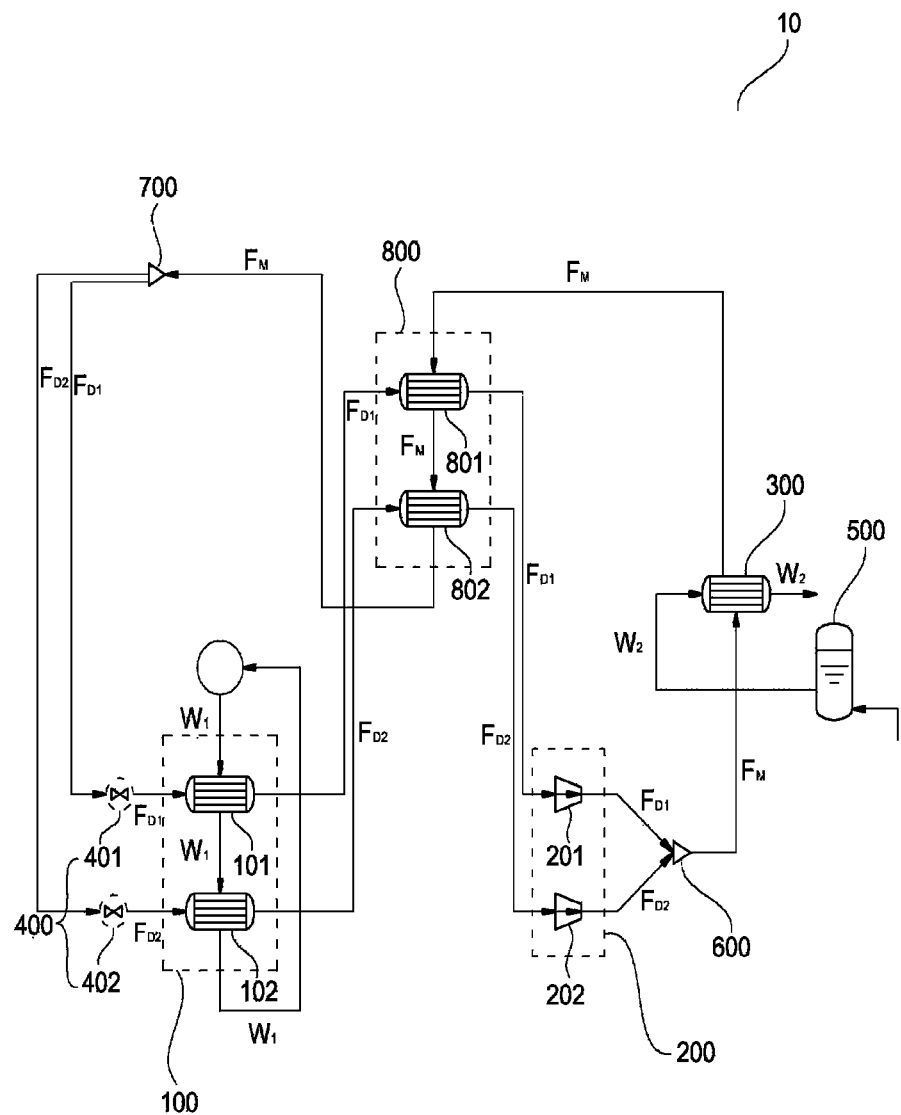

[Figure 9]
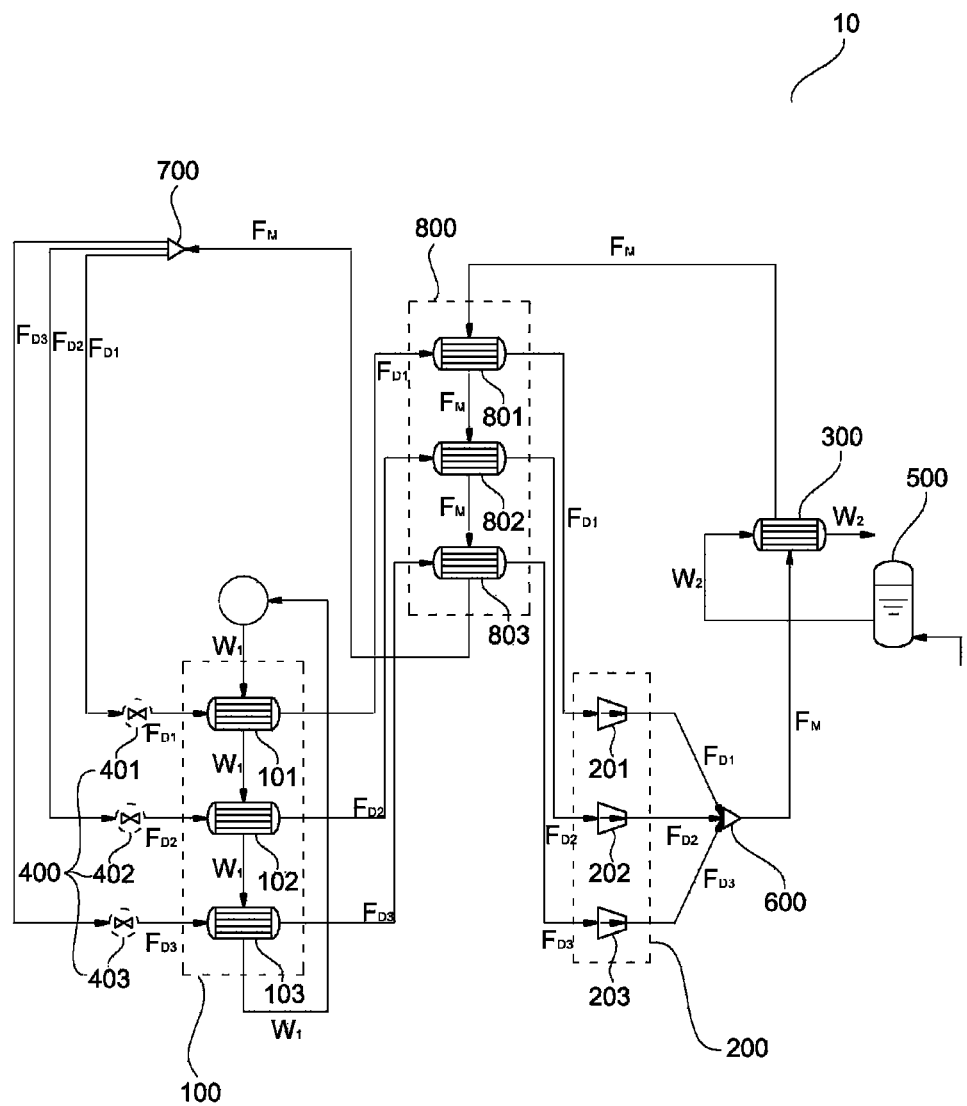

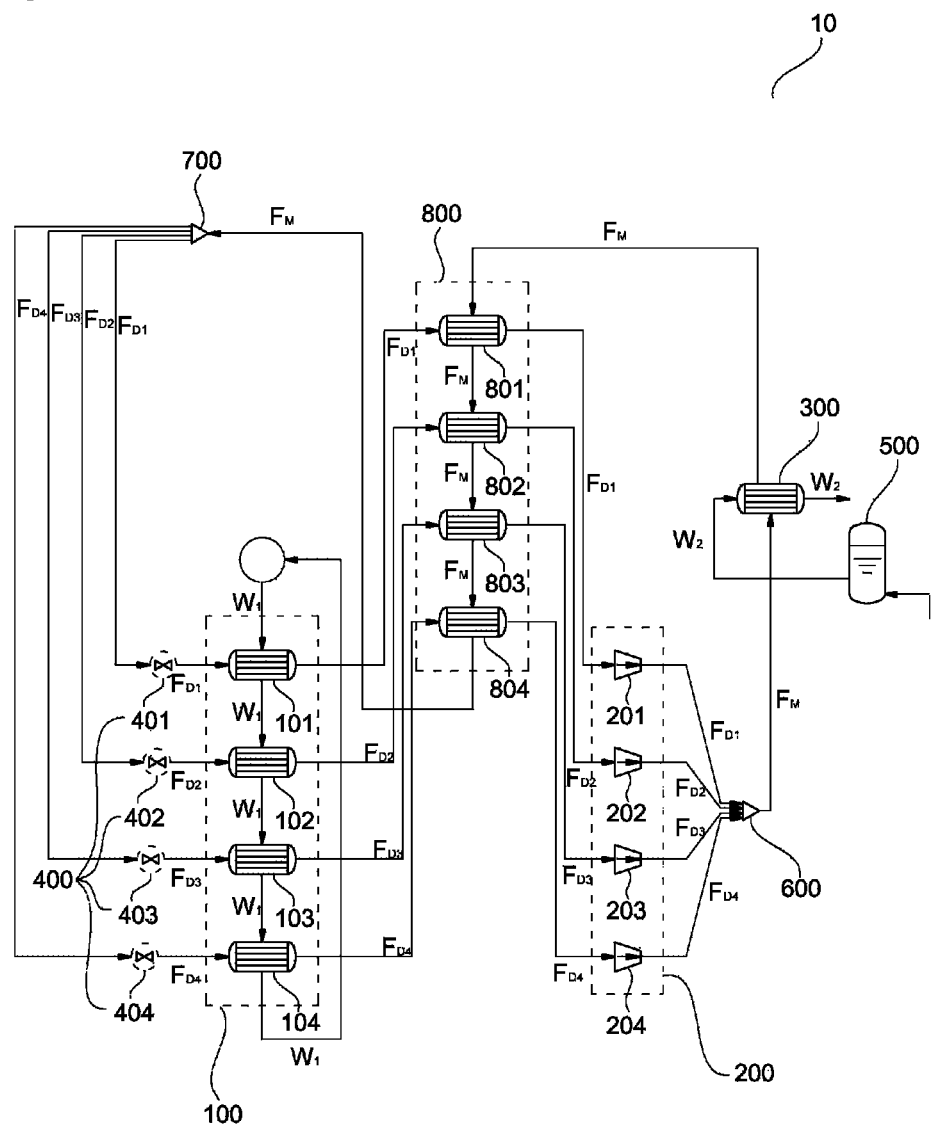
[Figure 10]

[Figure 11]
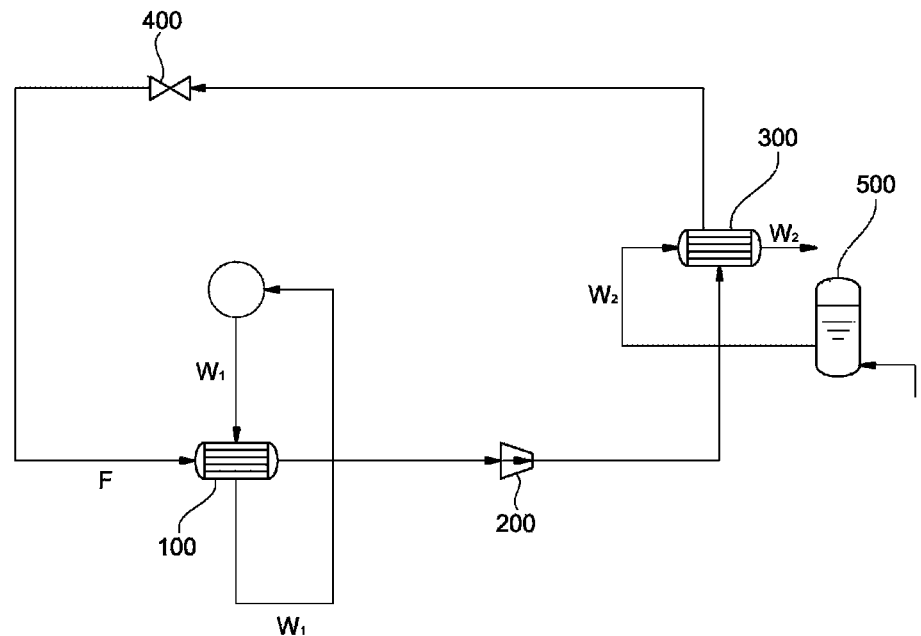
[Figure 12]
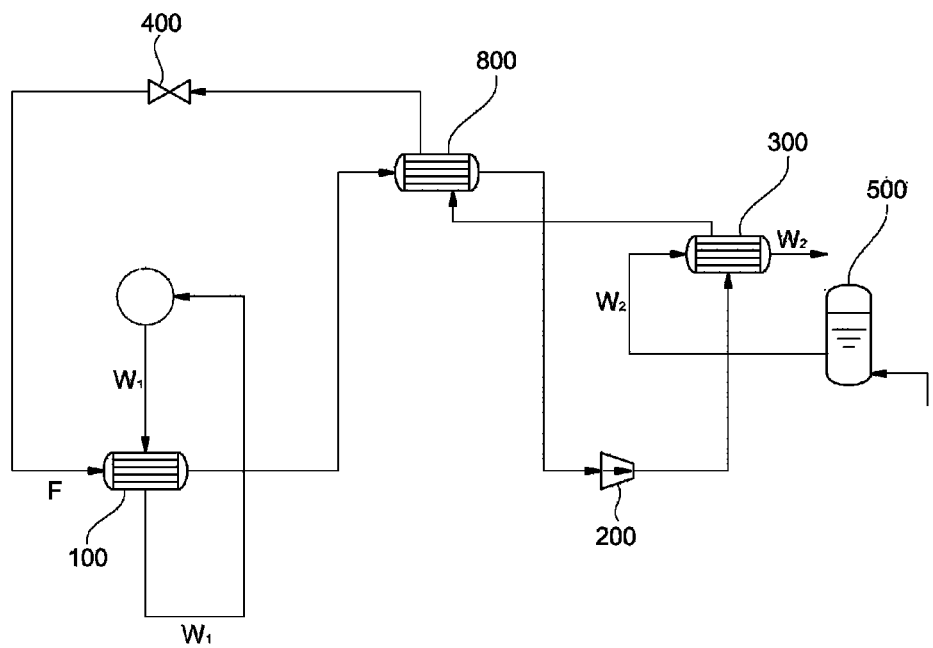

HEAT RECOVERY APPARATUS

TECHNICAL FIELD

The present application relates to a heat recovery apparatus and method.

This application is a National Stage Entry of International Application No. PCT/KR2016/006462, filed Jun. 17, 2016, and claims the benefit of and priority to Korean Application No. 10-2015-0086501, filed on Jun. 18, 2015, all of which are hereby incorporated by reference in their entirety for all purposes as if fully set forth herein.

BACKGROUND ART

In general chemical processes, heat exchange is made at various routes by way of reactors and distillation columns, and waste heat generated after such heat exchange can be re-used or discarded. For example, as in FIG. 1, when the waste heat is a low-grade heat source having a level of less than 120° C., for example, 70° C. to 110° C., it has a low temperature such that it is impossible to be essentially re-used, and thus the waste heat is discarded after condensing the condensate water.

Furthermore, low-pressure or high-pressure steams are used in various applications in the industrial fields and particularly, in the chemical processes, high temperature and pressure steams are mainly used. The high temperature and pressure steams are generally produced by heating normal temperature and pressure water to the vaporization point and applying high pressure to water turned into vapor to increase internal energy, where it is required to consume a large amount of energy in order to vaporize liquid water.

In order to solve the above problem, a heat recovery apparatus for recovering the low-grade heat source using a heat pump system is disclosed in Patent Document 1. However, in the case of the heat recovery apparatus, since only one of the refrigerant streams was heat exchanged with the waste heat stream to recover energy, there was a problem to require much energy, in order to compress the low temperature and pressure refrigerant stream flowing into the compressor into high temperature and pressure refrigerant stream.

(Patent Document 1) KR 2015-0000422A

DETAILED DESCRIPTION OF INVENTION

Technical Problem

The present application provides an apparatus and a method for recovering heat.

Technical Solution

The present application relates to a heat recovery apparatus. According to the heat recovery apparatus of the present application, since the low-grade heat source of less than 120° C. discharged in industrial sites or various chemical processes, for example, processes for producing the petrochemical products may be used without being discarded to produce steam and the produced steam may be utilized in various processes, it is possible to reduce the amount of high temperature steam as the external heat source for use in a reactor or distillation column and to maximize the energy-saving efficiency. In addition, in the case of the heat recovery apparatus using a conventional heat pump system, only one of the refrigerant streams was heat exchanged with the waste heat stream to recover energy of the waste heat, and mostly in the nature of the waste heat present in the sensible heat, the waste heat is recovered in lower temperature, as a large amount of energy is recovered, thereby requiring more energy in order to compress the refrigerant stream of low pressure flowing into the compressor, to the refrigerant stream of high temperature and pressure, but in the heat recovery apparatus of the present application, at least two refrigerant streams may be heat exchanged with the waste heat stream by dividing one refrigerant stream in a cascade method and circulating the resulting streams, and the pressure of the refrigerant stream flowing into the compressor can be adjusted relatively high compared to the heat recovery apparatus using the only one refrigerant stream, so that it is possible to reduce the amount of energy required for compression in the compressor. Besides, it is possible to prevent some vaporization phenomenon of the refrigerant that occurs during the isentrophic compression of the refrigerant, and thus to raise the heat exchange efficiency of the heat recovery apparatus.

DESCRIPTION OF THE DRAWINGS

FIG. 1 is a schematic view of a conventional waste heat disposal device.

FIG. 2 is a schematic view of an exemplary heat recovery apparatus according to one embodiment of the present application.

FIG. 3 is a schematic view of one embodiment of a heat recovery apparatus having two refrigerant streams of the present application.

FIG. 4 is a schematic view of one embodiment of a heat recover apparatus having three refrigerant streams of the present application.

FIG. 5 is a schematic view of one embodiment of a heat recovery apparatus having four refrigerant streams of the present application.

FIG. 6 is a schematic view of another embodiment of a heat recovery apparatus of the present application.

FIG. 7 is a graph illustrating the temperature-entropy diagram of an exemplary embodiment of the present application.

FIG. 8 is a schematic view of one embodiment of a heat recovery apparatus having two refrigerant streams of the present application.

FIG. 9 is a schematic view of one embodiment of a heat recovery apparatus having three refrigerant streams of the present application.

FIG. 10 is a schematic view of one embodiment of a heat recovery apparatus having four refrigerant streams of the present application.

FIG. 11 is a schematic view of one embodiment of a heat recovery apparatus according to a comparative example of the present application.

FIG. 12 is a schematic view of one embodiment of a heat recovery apparatus according to a comparative example of the present application.

Hereinafter, referring to the attached drawings, various embodiments of the present application are explained, but the attached drawings are illustrated, without limitation on the scope of the heat recovery apparatus according to the present application.

FIG. 2 is a diagram schematically illustrating an exemplary heat recovery apparatus (10) according to one embodiment of the present application.

As in FIG. 2, the heat recovery apparatus (10) of the present application includes a first heat exchange device (100), a compression device (200), a second heat exchange device (300) and at least two pressure drop devices (400). The first heat exchange device (100), the compression device (200), the second heat exchange device (300) and at least two pressure drop devices (400) can be connected through pipes, and for example, fluidically connected, so that the fluid can flow through the pipes. In one example, the pipes through which the fluid flows may be a circulation loop or a circulation system connected in order that the fluid circulates the first heat exchange device (100), the compression device (200), the second heat exchange device (300), and at least two pressure drop devices (400) sequentially. The term "heat exchange device" above may refer to one assembly that at least two heat exchangers are combined or a heat exchange unit including at least two heat exchangers, and also refer to only one heat exchanger. For example, the first heat exchange device (100) and the third heat exchange device (800) to be described below may be a heat exchange unit including at least two heat exchangers, and the second heat exchange device (300) may be a device composed of only one heat exchanger. The term "compression device" above refers to one assembly that at least two compressors are combined or a compression unit including at least two compressors.

As shown in FIG. 2, the heat recovery apparatus (10) of the present application includes a circulation loop that at least two refrigerant streams circulate. For example, in the heat recovery apparatus (10) of the present application, at least two refrigerant streams may be heat exchanged with the waste heat stream in stages by dividing one refrigerant stream to at least two refrigerant streams and circulating them, and the pressure of the refrigerant stream flowing into the compressor can be adjusted relatively high compared to the heat recovery apparatus using the only one refrigerant stream, so that it is possible to reduce the amount of energy required for compression in the compressor. In one example, in the heat recovery apparatus (10) of the present application, at least two refrigerant streams ($F_D$) including a first refrigerant stream ($F_{D1}$) and a second refrigerant stream ($F_{D2}$) flow into and out the first heat exchange device (100) and the compression device (200), respectively. For example, the at least two refrigerant streams ($F_D$) may be two streams consisting of the first refrigerant stream ($F_{D1}$) and the second refrigerant stream ($F_{D2}$), three streams consisting of the first refrigerant stream ($F_{D1}$), the second refrigerant stream ($F_{D2}$) and the third refrigerant stream ($F_{D3}$), or four streams consisting of the first refrigerant stream ($F_{D1}$), the second refrigerant stream ($F_{D2}$), the third refrigerant stream ($F_{D3}$), and the fourth refrigerant stream ($F_{D4}$). Since the greater the number of the refrigerant stream is, heat can be recovered in more excellent efficiency, the upper limit of the total number of the refrigerant stream is not particularly limited, but considering the equipment cost of devices and the process economic efficiency, and the like, the total number of the refrigerant streams may be 5 or less.

The total flow rate of the refrigerant streams ($F_D$) circulating through pipes may be 5,000 kg/hr to 100,000 kg/hr, for example, 10,000 kg/hr to 95,000 kg/hr, or 30,000 kg/hr to 90,000 kg/hr, and preferably 75,000 kg/hr to 95,000 kg/hr, but is not limited thereto. In addition, each of the flow rate of at least two refrigerant streams ($F_D$) circulating through the pipes may be 5,000 kg/hr to 50,000 kg/hr, for example, 10,000 kg/hr to 45,000 kg/hr, or 20,000 kg/hr to 40,000 kg/hr, and preferably 25,000 kg/hr to 35,000 kg/hr, but is not limited thereto.

As in FIG. 2, in the heat recovery apparatus (10) according to embodiments of the present application, at least two refrigerant streams ($F_D$) including the first refrigerant stream ($F_{D1}$) and the second refrigerant stream ($F_{D2}$) flow into the heat exchange device (100). The first heat exchange device (100) is included in the heat recovery apparatus (10) of the present application, in order to heat exchange the fluid stream coming from the outside with at least two refrigerant streams ($F_D$), and the refrigerant may be vaporized through the heat exchange and then flow out from the heat exchange device (100) as a vapor phase stream having relatively higher temperature than the refrigerant stream flowing into the first heat exchange device (100). The "vapor phase" above refers to a state having a rich gas component stream of all the components in the refrigerant stream, for example, a state that the gas component stream has a molar fraction of 0.9 to 1.0 among all the components in the refrigerant stream.

In one embodiment, at least two refrigerant streams ($F_D$) and the first fluid stream ($W_1$) such as a waste heat stream may flow into the first heat exchange device (100) through the fluidically connected pipes and the at least two refrigerant streams ($F_D$) and the first fluid stream ($W_1$), which are introduced, may be heat exchanged from each other, and then flow out from the first heat exchange device (100) through the fluidically connected pipes, respectively. More specifically, the first refrigerant stream ($F_{D1}$) flowing into the heat exchange device (100) is heat exchanged with the first fluid stream ($W_1$) flowing into the first heat exchange device (100), and the first fluid stream ($W_1$) heat exchanged with the first refrigerant stream ($F_{D1}$) is heat exchanged with the second refrigerant stream ($F_{D2}$) flowing into the first heat exchange device (100).

For example, when the first heat exchange device (100) is a heat exchange unit including a first-first heat exchanger (101) and a first-second heat exchanger (102), the first refrigerant stream ($F_{D1}$) and the second refrigerant stream ($F_{D2}$) may flow into the first-first heat exchanger (101) and the first-second heat exchanger (102), respectively, where the fluid stream ($W_1$) can be heat exchanged with, for example, the waste heat stream passing through the first heat exchange device (100), that is, passing through the first-first heat exchanger (101) and the first-second heat exchange (102) in turn. In one example, the first refrigerant stream ($F_{D1}$) flowing into the first heat exchange device (100) may be heat exchanged with the first fluid stream ($W_1$) flowing into the first heat exchange device (100), for example, the first-first heat exchanger (101), and the first fluid stream ($W_1$) heat exchanged with the first refrigerant stream ($F_{D1}$) in the first-first heat exchanger may be heat exchanged with the second refrigerant stream ($F_{D2}$) flowing into the first heat exchange device (100), for example, the first-second heat exchanger (102).

The first fluid flow ($W_1$) flowing into the first heat exchange device (100) may be, for example, a waste heat stream or a condensate water stream passing through a condenser, and the waste heat stream may be, for example, a cooling water of an exothermic reactor, but is not limited thereto. In this application, a waste heat stream of a low-grade heat source having a level of less than 120° C., for example, 70° C. to 110° C. may be preferably used.

In one example, the temperature of the first refrigerant stream ($F_{D1}$) flowing out from the first heat exchange device (100) and the temperature of the first fluid stream ($W_1$) flowing into the first heat exchange device (100) can meet Formula 1 below.

$$1° \text{C.} \leq T_{F1} - T_{R1} \leq 35° \text{C.} \qquad \text{[Formula 1]}$$

In Formula 1 above, $T_{F1}$ represents the temperature of the first fluid stream ($W_1$) flowing into the first heat exchange device (100), and $T_{R1}$ represents the temperature of the first refrigerant stream ($F_{D1}$) flowing out from the first heat exchanger (100).

For example, a difference between the temperature of the first refrigerant stream ($F_{D1}$) flowing out from the first heat exchange device (100) and the temperature of the first fluid stream ($W_1$) flowing into the first heat exchange device (100), $T_{F1}$–$T_{R1}$, may be adjusted in the range of 1 to 35° C., for example, 1 to 10° C., 7 to 15° C., 15 to 35° C. or 20 to 25° C.

As the temperature of the first refrigerant stream ($F_{D1}$) flowing out from the heat exchange device (100) and the temperature of the first fluid stream ($W_1$) flowing into the first heat exchange device (100) satisfy Formula 1 above, the first refrigerant stream ($F_{D1}$), which is first of all heat exchanged with the waste heat stream in the early stage, may flow into a compression device to be described later in a state of high temperature and high pressure, compared to relatively later stage streams of multistage refrigerant streams, for example, the second refrigerant stream ($F_{D2}$), the third refrigerant stream ($F_{D3}$) or the fourth refrigerant stream ($F_{D4}$), which are subsequently heat exchanged with the waste heat stream. Accordingly, it is possible to reduce the amount of energy used by the compressor.

If the temperature of the first refrigerant stream ($F_{D1}$) flowing out from the first heat exchange device (100) and the temperature of the first fluid stream ($W_1$) flowing into the first heat exchange device (100) satisfy Formula 1 above, they may be variously modulated depending on the types of processes to be applied and conditions of each process, without any particular limitation. In one example, the temperature of the first fluid stream ($W_1$) flowing into the first heat exchange device (100), for example, the first-first heat exchanger (101), may be 60° C. to 110° C., e.g., 60 to 80° C., 70° C. to 85° C., 90° C. to 95° C. or 90° C. to 110° C., but is not particularly limited thereto. In addition, the temperature of the first refrigerant stream ($F_{D1}$) flowing out from the first heat exchange device (100), for example, the first-first heat exchanger (101) may be 50° C. to 100° C., for example, 50° C. to 70° C., 60° C. to 75° C., 80° C. to 85° C. or 80° C. to 100° C., but is not particularly limited thereto. In this case, the temperature of the first fluid stream ($W_1$) flowing out from the first heat exchange device (100), for example, the first-first heat exchanger (101), after being heat exchanged with the refrigerant stream ($F_{D1}$), may be 40° C. to 110° C., for example, 40° C. to 60° C., 55° C. to 90° C., 70° C. to 85° C., or 80° C. to 110° C., but is not particularly limited thereto. In addition, the temperature of the first refrigerant stream ($F_{D1}$) flowing into the first heat exchange device (100), for example, the first-first heat exchanger (101) may be a temperature lower than the temperature of the first fluid stream ($W_1$) flowing into the first heat exchange device (100), 55° C. to 105° C., for example, 55° C. to 75° C., 65° C. to 80° C., 85° C. to 90° C. or 85° C. to 105° C., but is not limited thereto.

The pressure of the first refrigerant stream ($F_{D1}$) flowing into the first heat exchange device (100) can vary depending on the type and operation conditions of the refrigerant, which is not particularly limited. For example, the pressure of the first refrigerant stream ($F_{D1}$) flowing into the first heat exchange device (100) may be 2 kgf/cm$^2$g to 15 kgf/cm$^2$g, for example, 2 kgf/cm$^2$g to 7 kgf/cm$^2$g, 3 kgf/cm$^2$g to 6 kgf/cm$^2$g or 4 kgf/cm$^2$g to 15 kgf/cm$^2$g, but is not limited thereto. By controlling the pressure of the first refrigerant stream ($F_{D1}$) flowing into the first heat exchange device (100) to 2 kgf/cm$^2$g to 15 kgf/cm$^2$g, it is possible to easily adjust the compression ratio of the compression device. In general, the outflow pressure of the compressor is determined depending on the temperature, but when the inflow pressure is high, the compression ratio can be kept low. As the compression ratio is high, a high temperature steam can be generated from a low temperature heat source, where the performance factor is reduced, whereas the lower the compression ratio, the performance factor is increased, but there is a problem that the high temperature steam is difficultly generated from the low temperature heat source. In the above, the pressure unit kgf/cm$^2$g means a gauge pressure.

The pressure of the first fluid stream ($W_1$) flowing into and out from the first heat exchange device (100) is not particularly limited, and may be, for example, 0.5 kgf/cm$^2$g to 15 kgf/cm$^2$g, 1 kgf/cm$^2$g to 7 kgf/cm$^2$g or 1 kgf/cm$^2$g to 15 kgf/cm$^2$g.

In addition, the flow rate of the first fluid stream ($W_1$) flowing into the first heat exchange device (100) may be 5,000 kg/hr or more, for example, 10,000 kg/hr or more, 20,000 kg/hr or 25,000 kg/hr or more, but is not limited thereto. As the flow rate of the first fluid stream ($W_1$) flowing into the first heat exchange device (100) increases, the outflow temperature of the first fluid stream ($W_1$) flowing out after heat transfer is maintained high, even though the same amount of heat is transferred to the refrigerant, so that the outflow temperature of the first refrigerant stream ($F_{D1}$) flowing out from the first heat exchange device (100) may be also maintained high. Therefore, the upper limit of the flow rate of the first fluid stream ($W_1$) flowing into the first heat exchange device (100) is not particularly limited, and may be, for example, 500,000 kg/hr or less, or 350,000 kg/hr or less, considering efficiency and economics of the device, but is not limited thereto.

The first heat exchange device (100) refers to a device or machine for performing heat exchange between a fluid and a refrigerant, and, as stated above, one assembly that at least two heat exchangers are combined or a heat exchange unit including at least two heat exchangers. In one embodiment, the first heat exchange device (100) may include at least two heat exchangers, wherein the heat exchanger may be an evaporator to vaporize the liquid phase refrigerant stream to the vapor phase refrigerant stream.

In one embodiment, as in FIG. 2, at least two refrigerant streams ($F_D$) comprising the first and second refrigerant streams ($F_{D1}$, $F_{D2}$) flowing out from the first heat exchange device (100) flows into the compression device (200). The compression device (200) is included in the heat recovery apparatus (10) of the present application, in order to compress at least two vapor phase refrigerant streams ($F_D$) flowing out from the first heat exchange device (100) and to raise the temperature and pressure, and the relatively high temperature and pressure vapor phase refrigerant stream compared to the at least two refrigerant streams flowing out from the heat exchange device (100), which is compressed by passing through the compression device (200), may flow into the second heat exchange device (300).

For example, at least two refrigerant streams ($F_D$) flowing out from the first heat exchange device (100) may flow into the compression device (200) through the fluidically connected pipes, and the introduced at least two refrigerant streams ($F_D$) may flow out through the fluidically connected pipes after being compressed in the compression device (200).

In one example, the ratio of the pressure of the first refrigerant stream ($F_{D1}$) flowing out from the first heat exchange device (100) and flowing into the compression device (200) and the pressure of the first refrigerant stream ($F_{D1}$) flowing out from the compression device (200) can satisfy Formula 2 below.

$$2 \leq P_{C1}/P_{H1} \leq 6 \quad \text{[Formula 2]}$$

In Formula 2 above, $P_{C1}$ represents the pressure (bar) of the first refrigerant stream ($F_{D1}$) flowing out from the compression device (200), and $P_{H1}$ represents the pressure (bar) of the first refrigerant stream ($F_{D1}$) flowing out from the first heat exchange device (100) and flowing into the compression device (200).

That is, the ratio $P_{C1}/P_{H1}$ of the pressure of the first refrigerant stream ($F_{D1}$) flowing out from the first heat exchange device (100) and flowing into the compression device (200) and the pressure of the first refrigerant stream ($F_{D1}$) flowing out from the compression device (200) can be adjusted in the range of 2 to 6, for example, 2 to 5, preferably 2.2 to 3. The pressure ratio $P_{C1}/P_{H1}$ is a value calculated on the basis of the case when the unit of the pressure of the first refrigerant stream ($F_{D1}$) flowing out from the compression device (200) and the pressure of the first refrigerant stream ($F_{D1}$) flowing out from the first heat exchange device (100) is bar, and it is obvious in the art that if the value of the specific pressure being converted according to the unit of the measured pressure varies, the pressure ratio cannot satisfy Formula 2. Accordingly, the Formula 2 may include all the cases which is satisfied on converting the value of the measured pressure into the pressure unit of bar.

As the ratio of the pressure of the first refrigerant stream ($F_{D1}$) flowing out from the first heat exchange device (100) and flowing into the compression device (200) and the pressure of the first refrigerant stream ($F_{D1}$) flowing out from the compression device (200) satisfies the Formula 2, the amount of energy per unit mass required in the compressor may be reduced when compressing the refrigerant in the first heat exchange device (100).

If the pressure of the first refrigerant stream ($F_{D1}$) flowing out from the first heat exchange device (100) and flowing into the compression device (200) and the pressure of the first refrigerant stream ($F_{D1}$) flowing out from the compression device (200) satisfy the Formula 2, they are not particularly limited, and may be variously adjusted according to the types of processes to be applied and the conditions of each process. In one example, the pressure of the first refrigerant stream ($F_{D1}$) flowing out from the first heat exchange device (100) and flowing into the compression device (200) may be the same or different from the pressure of the first refrigerant stream ($F_{D1}$) flowing out from the first heat exchange device (100) as stated previously, and may be, for example, 2 kgf/cm²g to 15 kgf/cm²g, 2 kgf/cm²g to 7 kgf/cm²g or 4 kgf/cm²g to 15 kgf/cm²g, but is not limited thereto. In addition, the pressure of the first refrigerant stream ($F_{D1}$) flowing out from the compression device (200) may be 10 to 35 kgf/cm²g, for example, 15 to 25 kgf/cm²g, 18 to 24 kgf/cm²g, or 20 to 35 kgf/cm²g, but is not limited thereto.

In addition, the temperature of the at least two refrigerant streams ($F_D$) flowing out after being compressed in the compression device (200) may be 100° C. to 160° C., for example, 110° C. to 130° C., or 105° C. to 145° C., but is not limited thereto.

As the compression device (200), various compression devices (200) known in the art may be used without any limitation, as long as they are compression devices being capable of compressing vapor phase streams, and as described above, may be one assembly that at least two compressors are combined or a compression unit including at least two compressors, and in one example, the compressor may be a compressor, but it not limited thereto.

As in FIG. 2, in the exemplary heat recovery apparatus (10) of the present application, at least two refrigerant streams ($F_D$) comprising the first refrigerant stream ($F_{D1}$) flowing out from the compressing device (200) may flow into the second heat exchange device (300).

The second heat exchange device is included in the heat recovery apparatus (10) of the present application, in order to heat exchange the second fluid stream ($W_2$) coming from the outside with the refrigerant stream flowing out from the compression device (200), and the refrigerant may be condensed through the heat exchange and then flow out as a liquid phase stream having relatively lower temperature compared to the refrigerant stream flowing out from the compression device (200), and the second fluid stream ($W_2$) can absorb latent heat generated during condensation of the refrigerant. The "liquid phase" above refers to a state having a rich liquid component stream of all the components in the refrigerant stream, for example, a state that the liquid component stream has a molar fraction of 0.9 to 1.0 among all the components in the refrigerant stream.

In one example, the second fluid ($W_2$) flowing into the second heat exchange device may be make-up water, where the water heat-exchanged in the second heat exchange device (300) can be vaporized by absorbing the latent heat generated during condensation of the refrigerant and discharged in the form of steam.

For example, the second fluid stream ($W_2$) for heat exchanging at least two refrigerant streams flowing out from the compression device (200) may flow into the second heat exchange device (300) through the fluidically connected pipe, and the introduced at least two refrigerant streams ($F_D$) and second fluid stream ($W_2$) may be heat exchanged each other in the second heat exchange device (300), and then flow out from the second heat exchange device (300) through the fluidically connected pipes, respectively.

Temperature and pressure of the second fluid stream ($W_2$) flowing into the second heat exchange device (300) are not particularly limited, and the second fluid stream ($W_2$) having the various temperature and pressure can be introduced into the second heat exchange device. For example, the second fluid stream ($W_2$) having a temperature of 70° C. to 120° C., for example, 88 v to 96° C., or 115° C. to 118° C. and a pressure of 0.0 to 30.0 kgf/cm²g, for example, 0.5 to 18.0 kgf/cm²g may be introduced to the second heat exchange device (300).

In addition, the flow rate of the second fluid stream ($W_2$) flowing into the second heat exchange device (300) is not particularly limited, and may be 5,000 kg/hr to 500,000 kg/hr, for example, 5,000 kg/hr to 40,000 kg/hr, 50,000 kg/hr to 100,000 kg/hr, or 150,000 kg/hr to 400,000 kg/hr.

In one example, the water ($W_2$) heat exchanged with high temperature and pressure refrigerant stream ($F_D$) flowing out from the compression device (200) in the second heat exchange device (300) may flow out from the second heat exchange device (300) as a steam having a temperature of 100° C. to 170° C., for example, 115° C. to 120° C., 120° C. to 150° C., or 140° C. to 165° C. and a pressure of 0.0 kgf/cm²g to 7.0 kgf/cm²g, for example, 0.6 to 2.8 kgf/cm²g.

In addition, at least two refrigerant streams ($F_D$) heat exchanged with the second fluid stream ($W_2$) in the second heat exchange device (300) may flow out from the second heat exchange device (300) at a temperature of 115° C. to 130° C., for example, 118° C. to 125° C. or 120° C. to 128° C., preferably 120° C. to 125° C., without being limited thereto. The pressure of the refrigerant streams ($F_D$) heat exchanged with the second fluid stream ($W_2$) in the second heat exchange device (300) may be variously changed according to the type of the refrigerant and operation conditions, which can flow out from the second heat exchange device (300) at a pressure of 5.0 to 45.0 kgf/cm$^2$g, for example, 5.0 to 13.0 kgf/cm$^2$g, 8.0 to 25.0 kgf/cm$^2$g, 20.0 to 28.0 kgf/cm$^2$g, or 33.0 to 45.0 kgf/cm$^2$g, without being limited thereto.

The second heat exchange device (300) refers to a device or machine for performing heat exchange between flowing fluids and, in one embodiment, the second heat exchange device (300) may be a condenser to condense a vapor phase refrigerant stream into a liquid phase refrigerant stream.

Also, the exemplary heat recovery apparatus (10) of the present Application may further comprise a storage tank (500). As shown in FIG. 2, the storage tank (500) can be equipped in fluid communication with the second heat exchange device (300) through the pipe. The storage tank (500) is a device for supplying the second fluid stream ($W_2$) flowing into the second heat exchange device (300), in which the second fluid ($W_2$) flowing into the second heat exchange device (300), for example, water may be stored in the storage tank (500).

The second fluid stream ($W_2$) flowing out from the storage tank (500) may flow into the second heat exchange device (300) along the pipe to be heat exchanged with the refrigerant stream ($F_D$) flowing into the second heat exchange device (300). In this case, the heat exchanged second fluid stream ($W_2$), for example, high temperature and pressure water may be re-introduced into the storage tank, and then reduced in pressure to be discharged in the form of steam.

In one embodiment, as in FIG. 2, the heat recovery apparatus (10) of the present application may comprise a flow mixer.

The flow mixer (600) is a member for combining at least two refrigerant streams flowing out from the compression device (200) into a single stream, where the mixed refrigerant stream ($F_M$) combined as a single stream may flow into the second heat exchange device (300).

In one example, the flow mixer (600) can be formed in the pipe that the refrigerant flows, and, for example, located in the pipe formed so that at least two refrigerant streams ($F_D$) flowing out from the compression device (200) flow into the second heat exchange device (300). For instance, the flow mixer (600) can be formed such that at least two refrigerant streams ($F_D$) including the first and second refrigerant streams ($F_{D1}$, $F_{D2}$) flowing out from the compression device (200) flow into the flow mixer (600) and, after being mixed, flow into the second heat exchange device (300), where the mixed, single refrigerant stream ($F_M$) flowing into the second heat exchange device (300) may be heat exchanged with the second fluid stream ($W_2$) flowing into the second heat exchange device (300).

In addition, as in FIG. 2, the heat recovery apparatus (10) of the present application may further comprise a flow splitter.

The flow splitter (700) is a member for again dividing a single refrigerant stream ($F_M$) combined in the flow mixer (600) into at least two refrigerant streams ($F_D$), where the refrigerant stream ($F_M$) combined in the above mentioned flow mixer (600) may be divided into at least two refrigerant streams ($F_D$) in the flow splitter (700), and then flow into the above mentioned first heat exchange device (100).

In one example, the flow splitter (700) can be formed in the pipe that the refrigerant flows, and for example, formed at the front end of at least two pressure drop devices (400) or between at least two pressure drop devices (400). For example, when at least two refrigerant streams ($F_D$) flowing out from the compression device (200) are mixed via the flow mixer (600), and then flow out from the second heat exchange device (300), the flow splitter (700) can be located in the pipe formed so that the mixed, single refrigerant stream ($F_M$) flowing out from the second heat exchange device (300) flows into at least two pressure drop devices (400). In this case, the refrigerant stream ($F_M$) mixed in the above mentioned flow mixer (600) flows out from the second heat exchange device (300) after being heat exchanged in the second heat exchange device (300), and the mixed refrigerant stream ($F_M$) passes through the flow splitter (700) to be again divided into at least two refrigerant streams ($F_D$), which may subsequently flow into the first heat exchange device (100), respectively. In addition, the flow splitter (700) may be located between at least two pressure drop devices (400). For example, the single refrigerant stream depressurized via one pressure drop device, for example, the first pressure drop device (401) is divided into at least two refrigerant streams ($F_D$) via the flow splitter prior to flowing into the other pressure drop devices, for example, the second and third pressure drip devices (402, 403), and then, one depressurized refrigerant stream, for example, the first refrigerant stream ($F_D$) may flow into the first heat exchange device (100) without passing through the pressure drop device, and the remaining depressurized refrigerant streams, for example, the second and third refrigerant streams ($F_{D2}$, $F_{D3}$) may be formed so as to flow into the first heat exchange device (100) after being introduced into the second and third pressure drop devices (402, 403), respectively.

In one example, the mixed refrigerant stream ($F_M$) flowing out from the second heat exchange device (300) flows into the flow splitter (700), and the mixed refrigerant stream ($F_M$) flowing into the flow splitter (700) flows into the at least two pressure drop devices (400) after being divided into at least two refrigerant streams ($F_D$) including the first refrigerant stream ($F_{D1}$) and the second refrigerant stream ($F_{D2}$) by way of division in the flow splitter (700).

In one embodiment, as in FIG. 2, the refrigerant stream flowing out from the second heat exchange device (300) flows into at least two pressure drop devices (400), respectively.

The pressure drop device (400) is included in the heat recovery apparatus (10) of the present application, in order to expand at least two liquid phase refrigerant streams ($F_D$) flowing out from the second heat exchange device (300) and to lower the temperature and pressure, and at least two refrigerant streams ($F_D$) passing through the pressure drop device may be expanded and then re-introduced into the above mentioned first heat exchange device (100) as a relatively low temperature and pressure state compared to the refrigerant stream flowing out from the second heat exchange device (300).

For example, at least two liquid phase refrigerant streams ($F_D$) flowing out from the second heat exchange device (300) may flow into the pressure drop device (400) via the fluidically connected pipe, and the introduced at least two refrigerant streams ($F_D$) may be expanded in the pressure drop device (400), respectively, and then flow out via the fluidically connected pipe as a relatively low temperature and pressure state compared to the refrigerant stream flowing out from the second heat exchange device (300). In one example, at least two refrigerant streams flowing out from the pressure drop device (400) may flow out from the pressure drop device (400) at a temperature of 40° C. to 110°

C., for example, 45° C. to 55° C. or 74° C. to 82 v, preferably 85° C. to 90° C., without being limited thereto. In addition, the pressure of at least two refrigerant streams ($F_D$) flowing out from the pressure drop device (400) may be variously changed according to the type of the refrigerant and operation conditions, and may be, for example, 5.0 kgf/cm²g to 45.0 kgf/cm²g, for example, 5.1 kgf/cm²g to 8.3 kgf/cm²g, 12.0 kgf/cm²g to 14.5 kgf/cm²g or 5.6 kgf/cm²g to 8.8 kgf/cm²g, and preferably may flow out from the pressure drop device at a pressure of 5.2 kgf/cm²g to 9.3 kgf/cm²g, but is not limited thereto.

In the heat recovery apparatus (10) of the present application, the temperature and pressure of the at least two refrigerant streams ($F_D$) flowing out from the at least two pressure drop devices (400), respectively, may be differently adjusted with each other, whereby the first fluid stream ($W_1$) flowing into the first heat exchange device (100) may be heat exchanged with the at least two refrigerant streams ($F_D$) in a stepwise fashion. In one embodiment, the first refrigerant stream ($F_{D1}$), which is first of all heat exchanged with the first fluid stream ($W_1$) flowing into the first heat exchange device (100), may pass through the first pressure drop device (401) and flow out from the first pressure drop device (400) at a temperature of 50° C. to 100° C., for example, 58° C. to 62° C., 70° C. to 85° C. or 82° C. to 88° C., and also, flow out from the first pressure drop device (401) at a pressure of 1 to 16 kg/cm²g, for example, 4 to 10.0 kg/cm²g, or 5.2 to 9.3 kg/cm²g, and then flow into the above mentioned first heat exchange device (100). In addition, the second refrigerant stream ($F_{D2}$), which is heat exchanged with the first fluid stream ($W_1$) heat exchanged with the first refrigerant stream ($F_{D1}$) and flows into the first heat exchange device (100), may flow out from the second pressure drop device (402) at a temperature of 40° C. to 100° C., for example, 48° C. to 52° C., 60° C. to 75° C., 72° C. to 78° C. or 70° C. to 80° C., and also, flow out from the second pressure drop device (402) at a pressure of 3.0 to 15.0 kg/cm²g, for example, 3.0 to 5.0 kg/cm²g, 4.2 to 6.2 kg/cm²g, 5.2 to 7.1 kg/cm²g or 11.0 to 15.0 kg/cm²g, and then flow into the above mentioned first heat exchange device (100).

The pressure drop device (400) can be, for example, a control valve or a turbine installed in the pipes, respectively, that at least two refrigerant streams ($F_D$) flowing out from the third heat exchange device (300) flow.

In one example, if the pressure drop device (400) is a turbine, the turbine may be a power generator. For example, the pressure drop device (400) may be a hydraulic turbine that can convert the mechanical energy of the refrigerant flowing through the pipe, that is, the fluid into the electrical energy, and when using the hydraulic turbine, the heat recovery apparatus itself may produce the power consumed in the compressor, so that it is possible to increase the performance factor of the heat recovery apparatus.

As described above, the heat exchange device of the present application may be one assembly that at least two heat exchangers are combined or a heat exchange unit including two or more heat exchangers and a compression device (200) may be one assembly that at least two compressors are combined or a compression unit including at least two compressors.

In one example, the first heat exchange device (100) may comprise at least two heat exchangers and the compression device (200) may comprise at least two compressors.

FIG. 3 is a view schematically showing one embodiment of a heat recovery apparatus (10) having two refrigerant streams of the present application.

As shown in FIG. 3, the first heat exchange device (100) may comprise a first-first heat exchanger (101) and a first-second heat exchanger (102), the compression device (200) may comprise a first compressor (201) and a second compressor (202), and the pressure drop device (400) may comprise a first pressure drop device (401) and a second pressure drop device (402).

In this case, as shown in FIG. 3, the first fluid stream ($F_{D1}$) may flow into the first-first heat exchanger (101), and the first fluid stream ($W_1$) flowing out from the first-first heat exchanger (101) may flow into the first-second heat exchanger (102). In addition, the first refrigerant stream ($F_{D1}$) may flow into the first-first heat exchanger (101), and the second refrigerant stream ($F_{D2}$) may flow into the first-second heat exchanger (102).

Accordingly, the first refrigerant stream ($F_{D1}$) flowing into the first-first heat exchanger (101) may be heat exchanged in the first-first heat exchanger (101) with the first fluid stream ($W_1$) flowing into the first-first heat exchanger (101), and the second refrigerant stream ($F_{D2}$) flowing into the first-second heat exchanger (102) may be heat exchanged in the first-second heat exchanger (102) with the first fluid stream ($W_1$) flowing out from the first-first heat exchanger (101) and flowing into the first-second heat exchanger (102). In addition, the first refrigerant stream ($F_{D1}$) flowing out after being heat exchanged in the first-first heat exchanger (101) may flow into the first compressor (201), and the second refrigerant outlet stream ($F_{D2}$) flowing out from the first-second heat exchanger (102) may flow into the second compressor (202).

At this time, the first refrigerant stream ($F_{D1}$) flowing into the first-first heat exchanger (101) is adjusted to have a relatively high temperature and pressure, compared to the second refrigerant stream ($F_{D2}$) in the first pressure drop device (401) and then flows into the first heat exchange device (100), whereby the temperature and pressure of the first refrigerant stream ($F_{D1}$) flowing into the compression device (200), for example the first compressor (201) after heat exchange can be maintained high enough to reduce the energy required for compression.

Furthermore, the first refrigerant stream ($F_{D1}$) flowing out from the first compressor (201) and the second refrigerant stream ($F_{D2}$) flowing out from the second compressor (202) may flow into the second heat exchange device (300), and the first and second refrigerant streams ($F_{D1}$, $F_{D2}$) flowing into the second heat exchange device (300) may be heat exchanged with the second fluid stream ($W_2$) flowing into the second heat exchange device (300), for example, water to generate steam.

In addition, the first refrigerant stream ($F_{D1}$) flowing out from the second heat exchange device (300) flows into the first pressure drop device (401), so that it may be depressurized to have a relatively higher temperature and pressure than the second refrigerant stream ($F_{D2}$), and the second refrigerant stream ($F_{D2}$) flowing out from the second heat exchange device (300) flows into the second pressure drop device (402), so that it may be depressurized to have a relatively lower temperature and pressure than the first refrigerant stream ($F_{D1}$).

The first refrigerant stream ($F_{D1}$) flowing out after being depressurized in the first pressure drop device (401) as above may flow into the first-first heat exchanger (101), and the second refrigerant stream ($F_{D2}$) flowing out after being depressurized in the second pressure drop device (402) may flow into the first-second heat exchanger (102).

FIG. 4 is a view schematically showing one embodiment of the heat recovery apparatus (10) having three refrigerant streams of the present application.

As shown in FIG. 4, in the heat recovery apparatus (10) of the present application, the first heat exchange device (100) may comprise the first-first heat exchanger (101), the first-second heat exchanger (102) and the first-third heat exchanger (103), the compression device (200) may comprise the first compressor (201), the second compressor (202), and the third compressor (203), and the pressure drop device (400) may comprise the first pressure drop device (401), the second pressure drop device (402) and the third pressure drop device (403).

In this case, as shown in FIG. 4, the first fluid stream ($W_1$) may flow into the first-first heat exchanger (101), the first fluid stream ($W_1$) flowing out from the first-first heat exchanger (101) may flow into the first-second heat exchanger (102), and the first fluid stream ($W_1$) flowing out from the first-second heat exchanger (102) may flow into the first-third heat exchanger (103). In addition, the first refrigerant stream ($F_{D1}$) may flow into the first-first heat exchanger (101), the second refrigerant stream ($F_{D2}$) may flow into the first-second heat exchanger (102), and the third refrigerant stream ($F_{D3}$) may flow into the first-third heat exchanger (103).

Accordingly, the first refrigerant stream ($F_{D1}$) flowing into the first-first heat exchanger (101) may be heat exchanged in the first-first heat exchanger (101) with the first fluid stream ($W_1$) flowing into the first-first heat exchanger (101), the second refrigerant stream ($F_{D2}$) flowing into the first-second heat exchanger (102) may be heat exchanged with the first fluid stream ($W_1$) flowing out from the first-first heat exchanger (101) and flowing into the first-second heat exchanger (102), and the third refrigerant stream ($F_{D3}$) flowing into the first-third heat exchanger (103) may be heat exchanged with the first fluid stream ($W_1$) flowing out from the first-second heat exchanger (102) and flowing into the first-third heat exchanger (103). In addition, the first refrigerant stream ($F_{D1}$) flowing out from the first-first heat exchanger (101) may flow into the first compressor (201), the second refrigerant stream ($F_{D2}$) flowing out from the first-second heat exchanger (102) may flow into the second compressor (202), and the third refrigerant stream ($F_{D3}$) flowing out from the first-third heat exchanger (103) may flow into the third compressor (203).

At this time, the first refrigerant stream ($F_{D1}$) flowing into the first-first heat exchanger (101), as described above, is adjusted in the pressure drop device (401) to have a relatively high temperature and pressure, compared to the second refrigerant stream ($F_{D2}$) and the third refrigerant stream ($F_{D3}$) and then flows into the first heat exchange device (100), whereby the temperature and pressure of the first refrigerant stream ($F_{D1}$) flowing into the compression device (200), for example the first compressor (201) after heat exchange can be maintained high enough to reduce the energy required for compression.

Furthermore, the first refrigerant stream ($F_{D1}$) flowing out from the first compressor (201), the second refrigerant stream ($F_{D2}$) flowing out from the second compressor (202) and the third refrigerant stream ($F_{D3}$) flowing out from the third compressor (203) may flow into the second heat exchange device (300), and the first, second and third refrigerant stream ($F_{D1}$, $F_{D2}$, $F_{D3}$) flowing into the second heat exchange device (300) may be heat exchanged with the second fluid stream ($W_2$) flowing into the second heat exchange device (300), for example, water to generate steam.

In addition, the first refrigerant stream ($F_{D1}$) flowing out from the second heat exchange device (300) flows into the first pressure drop device (401), so that it may be depressurized to have a relatively higher temperature and pressure than the second refrigerant stream ($F_{D2}$) and the third refrigerant stream ($F_{D3}$), and the second refrigerant stream ($F_{D2}$) flowing out from the second heat exchange device (300) flows into the second pressure drop device (402), so that it may be depressurized to have a relatively lower temperature and pressure than the first refrigerant stream ($F_{D1}$). In addition, the third refrigerant stream ($F_{D3}$) flowing out from the second heat exchange device (300) flows into the third pressure drop device (403), so that it may be depressurized to have a relatively lower temperature and pressure than the first and second refrigerant streams ($F_{D1}$, $F_{D2}$).

The first refrigerant stream ($F_{D1}$) flowing out after being depressurized in the first pressure drop device (401) as above may flow into the first-first heat exchanger (101), the second refrigerant stream ($F_{D2}$) flowing out after being depressurized in the second pressure drop device (402) may flow into the first-second heat exchanger (102), and the third refrigerant stream ($F_{D3}$) flowing out after being depressurized in the third pressure drop device (403) may flow into the first-third heat exchanger (103).

FIG. 5 is a view schematically showing one embodiment of the heat recovery apparatus (10) having four refrigerant streams of the present application.

As shown in FIG. 5, in the heat recovery apparatus (10) of the present application, the first heat exchange device (100) may comprise the first-first heat exchanger (101), the first-second heat exchanger (102), the first-third heat exchanger (103) and the first-fourth heat exchanger (104), the compression device (200) may comprise the first compressor (201), the second compressor (202), the third compressor (203) and the fourth compressor (204), and the pressure drop device (400) may comprise the first pressure drop device (401), the second pressure drop device (402), the third pressure drop device (403) and the fourth pressure drop device (404).

In this case, as shown in FIG. 5, the first fluid stream ($W_1$) may flow into the first-first heat exchanger (101), the first fluid stream ($W_1$) flowing out from the first-first heat exchanger (101) may flow into the first-second heat exchanger (102), the first fluid stream ($W_1$) flowing out from the first-second heat exchanger (102) may flow into the first-third heat exchanger (103) and the first fluid stream ($W_1$) flowing out from the first-third heat exchanger (103) may flow into the first-fourth heat exchanger (104). In addition, the first refrigerant stream ($F_{D1}$) may flow into the first-first heat exchanger (101), the second refrigerant stream ($F_{D2}$) may flow into the first-second heat exchanger (102), the third refrigerant stream ($F_{D3}$) may flow into the first-third heat exchanger (103) and the fourth refrigerant stream ($F_{D4}$) may flow into the first-fourth heat exchanger (104).

Accordingly, the first refrigerant stream ($F_{D1}$) flowing into the first-first heat exchanger (101) may be heat exchanged with the first fluid stream ($W_1$) flowing into the first-first heat exchanger (101), the second refrigerant stream ($F_{D2}$) flowing into the first-second heat exchanger (102) may be heat exchanged with the first fluid stream ($W_1$) flowing out from the first-first heat exchanger (101) and flowing into the first-second heat exchanger (102), the third refrigerant stream ($F_{D3}$) flowing into the first-third heat exchanger (103) may be heat exchanged with the first fluid stream ($W_1$) flowing out from the first-second heat exchanger (102) and flowing into the first-third heat exchanger (103) and the fourth refrigerant stream ($F_{D4}$) flowing into the first-fourth heat exchanger (104) may be heat exchanged with the first fluid stream ($W_1$) flowing out from the first-third heat exchanger (103) and flowing into the first-fourth heat exchanger (104). In addition, the first refrigerant stream ($F_{D1}$) flowing out from the first-first heat exchanger (101) may flow into the first compressor (201), the second refrigerant stream ($F_{D2}$) flowing out from the first-second heat exchanger (102) may flow into the second compressor (202), the third refrigerant stream ($F_{D3}$) flowing out from the first-third heat exchanger (103) may flow into the third compressor (203) and the fourth refrigerant stream ($F_{D4}$) flowing out from the first-fourth heat exchanger (103) may flow into the fourth compressor (204).

At this time, the first refrigerant stream ($F_{D1}$) flowing into the first-first heat exchanger (101), as described above, is adjusted in the pressure drop device (401) to have a relatively high temperature and pressure, compared to the second refrigerant stream ($F_{D2}$), the third refrigerant stream ($F_{D3}$) and the fourth refrigerant stream ($F_{D4}$) and then flows into the first heat exchange device (100), whereby the temperature and pressure of the first refrigerant stream ($F_{D1}$) flowing into the compression device (200), for example the first compressor (201) after heat exchange can be maintained high enough to reduce the energy required for compression.

Furthermore, the first refrigerant stream ($F_{D1}$) flowing out from the first compressor (201), the second refrigerant stream ($F_{D2}$) flowing out from the second compressor (202), the third refrigerant stream ($F_{D3}$) flowing out from the third compressor (203) and the fourth refrigerant stream ($F_{D4}$) flowing out from the fourth compressor (204) may flow into the second heat exchange device (300), and the first, second, third and fourth refrigerant streams ($F_{D1}$, $F_{D2}$, $F_{D3}$, $F_{D4}$) flowing into the second heat exchange device (300) may be heat exchanged with the second fluid stream ($W_2$) flowing into the second heat exchange device (300), for example, water to generate steam.

In addition, the first refrigerant stream ($F_{D1}$) flowing out from the second heat exchange device (300) flows into the first pressure drop device (401), so that it may be depressurized to have a relatively higher temperature and pressure than the second refrigerant stream ($F_{D2}$), the third refrigerant stream ($F_{D3}$) and the fourth refrigerant stream ($F_{D4}$), and the second refrigerant stream ($F_{D2}$) flowing out from the second heat exchange device (300) flows into the second pressure drop device (402), so that it may be depressurized to have a relatively lower temperature and pressure than the first refrigerant stream ($F_{D1}$). In addition, the third refrigerant stream ($F_{D3}$) flowing out from the second heat exchange device (300) flows into the third pressure drop device (403), so that it may be depressurized to have a relatively lower temperature and pressure than the first and second refrigerant streams ($F_{D1}$, $F_{D2}$), and the fourth refrigerant stream ($F_{D4}$) flowing out from the second heat exchange device (300) flows into the fourth pressure drop device (404), so that it may be depressurized to have a relatively lower temperature and pressure than the first, second and third refrigerant streams ($F_{D1}$, $F_{D2}$, $F_{D3}$).

The first refrigerant stream ($F_{D1}$) flowing out after being depressurized in the first pressure drop device (401) as above may flow into the first-first heat exchanger (101), the second refrigerant stream ($F_{D2}$) flowing out after being depressurized in the second pressure drop device (402) may flow into the first-second heat exchanger (102), the third refrigerant stream ($F_{D3}$) flowing out after being depressurized in the third pressure drop device (403) may flow into the first-third heat exchanger (103) and the fourth refrigerant stream ($F_{D4}$) flowing out after being depressurized in the fourth pressure drop device (404) may flow into the first-fourth heat exchanger (104).

In the heat recovery apparatus (10) of the present application, the refrigerant streams passing through the first heat exchange device (100), the compression device (200), the second heat exchange device (300) and the pressure drop device (400) via the pipes each have different temperature and pressure characteristics, and flow into or flow out from the first heat exchange device (100), the compression device (200), the second heat exchange device (300) and the pressure drop device (400) as vapor phase and/or liquid phase streams, whereby latent heat according to the change of temperature, pressure and state of the refrigerant streams may be used as a heat source for generating steam.

In one example, at least two refrigerant streams ($F_D$) flowing into the first heat exchange device (100) may be liquid phase streams, and the volume fraction of the liquid phase streams in the at least two refrigerant streams may be 0.5 to 1.0, for example, 0.9 to 1.0, preferably 0.99 to 1.0.

At least two refrigerant streams ($F_D$) flowing out from the first heat exchange device (100) and flowing into the compression device (200) may be vapor phase streams, and the volume fraction of the vapor phase streams in the at least two refrigerant streams may be 0.9 to 1.0, for example, 0.95 to 1.0, preferably from 0.99 to 1.0.

Also, at least two refrigerant streams ($F_D$) flowing out from the compression device (200) after the isentropic compression may be vapor phase streams, and the volume fraction of the vapor phase streams in the at least two refrigerant streams may be 0.7 to 1.0, for example, 0.95 to 1.0, preferably from 0.99 to 1.0.

The refrigerant stream ($F_D$) flowing out from the second heat exchange device (300) and flowing into the pressure drop device (400) may be a liquid phase stream, and the volume fraction of the liquid phase stream in the mixed refrigerant stream may be 0.9 to 1.0, for example, 0.95 to 1.0, preferably from 0.99 to 1.0.

In addition, at least two refrigerant streams ($F_D$) flowing out from the pressure drop device (400) may be liquid phase streams, and the volume fraction of the vapor phase streams in the at least two refrigerant streams may be 0 to 0.5, e.g., 0 to 0.3, preferably from 0 to 0.1.

In the above, the volume fraction refers to the ratio of the volume flow rate of the liquid phase stream or the vapor phase stream to the volume flow rate of all the refrigerant streams flowing through the pipes, in which the volume flow rate represents the volume of the fluid flowing per unit hour and can be calculated by Formula 4 below.

$$\text{Volume flow rate} = Av (m^3/s) \quad \text{[Formula 4]}$$

In Formula 4 above, A represents the cross-sectional area ($m^2$) of a pipe, and v represents the flow velocity of the refrigerant stream (m/s).

Another embodiment of the heat recovery apparatus (10) of the present application comprises a third heat exchange device (800). FIG. 6 is a view schematically showing another embodiment of the heat recovery apparatus (10) of the present application.

As shown in FIG. 6, the heat recovery apparatus (10) of the present application further comprises the third heat exchange device (800) positioned between the first heat exchange device and the compression device (200) and between the second heat exchange device and the pressure drop device. For example, the third heat exchange device (800) may be connected to the pipe connected between the first heat exchange device (100) and the compression device (200) and the pipe connected between the second heat exchange device (300) and the pressure drop device (400), and in one example, the third heat exchange device (800) may be fluidically connected to the pipes such that at least two refrigerant streams ($F_D$) flowing out from the first heat exchange device (100) flow into the compression device (200) after passing through the third heat exchange device (800), and the refrigerant stream flowing out from the second heat exchange device (300) flows into the pressure drop device (400) after passing through the third heat exchange device (800). As the heat recovery apparatus (10) of the present application comprises the third heat exchange device (800), some vaporization phenomenon of the refrigerant occurred during the isentropic compression of the refrigerant can be prevented and thus the heat exchange efficiency of the heat recovery apparatus (10) can be raised. In the above, the "isentropic compression" means compressing in the condition of maintaining constant the entropy of the system, and, for instance, may refer to adiabatic compression process compressing in a state of no heat exchange with the surrounding of the system.

FIG. 7 is a graph illustrating the temperature-entropy diagram of an exemplary refrigerant of the present application. In one example, the refrigerant circulating the heat recovery apparatus (10), as shown in FIG. 7, may be a refrigerant having a positive slope of the tangent line of the saturated vapor curve in the temperature-entropy diagram, and for example, the slope of the tangent line of the saturated vapor curve having the horizontal axis of entropy (J/kg·K) and the vertical axis of temperature (° C.) in the temperature-entropy diagram of the refrigerant may be 1 to 3 at 50° C. to 130° C. The saturated vapor curve in the temperature-entropy diagram refers to the right side curve portion on the basis of the critical point of the diagram. That is, as shown in FIG. 7, when the refrigerant is isentropically compressed (arrow direction in FIG. 7) in the temperature-entropy diagram of the refrigerant, the slope of the tangent line of the saturated vapor curve of the refrigerant has a positive slope, so that a section causing the phase change from the vapor phase to the liquid phase is present and thus a phenomenon vaporizing some of the refrigerant stream in the compression device (200) may be caused. In order to prevent some vaporization phenomenon of the refrigerant, the heat recovery apparatus (10) of the present application may comprise the heat exchange device (800), and thus, increase the heat exchange efficiency of the heat recovery apparatus (10).

If the refrigerant is a refrigerant that the slope of the tangent line of the saturated vapor curve in the temperature-entropy diagram has a positive value, a variety of refrigerants known in the art may be used, but is not particularly limited, and for example, at least one refrigerant selected from the group consisting of R245fa, R1234ze and R1234yf may be used.

As in FIG. 6, in the heat recovery apparatus (10) according to embodiments of the present application, at least two refrigerant streams ($F_D$) including the first and second refrigerant streams ($F_{D1}$, $F_{D2}$) flowing out from the first heat exchange device (100) flow into the compression device (200) after being introduced into the third heat exchange device (800), at least two refrigerant streams ($F_D$) including the first and second refrigerant streams ($F_{D1}$, $F_{D2}$) flowing out from the second heat exchange device (300) flow into the pressure drop device (400) after being introduced into the third heat exchange device (800), and at least two refrigerant streams ($F_D$) flowing out from the first heat exchange device (100) and the refrigerant stream flowing out from the second heat exchange device (300) can be heat exchanged in the third heat exchange device (800).

For example, in the third heat exchange device (800), the first refrigerant stream ($F_{D1}$) flowing out from the first heat exchange device (100) and the first refrigerant stream ($F_{D1}$) flowing out from the second heat exchange device (200) may be heat exchanged, and the second refrigerant stream ($F_{D2}$) flowing out from the first heat exchange device (100) and the second refrigerant stream ($F_{D2}$) flowing out from the second heat exchange device (300) may be heat exchanged.

In one embodiment, as shown in FIG. 6, the heat recovery apparatus (10) may further comprise the flow mixer (600) and the flow splitter (700).

The flow mixer, as described above, is a member for combining at least two refrigerant streams ($F_D$) flowing out from the compression device (200) into a single stream, where the mixed refrigerant stream ($F_M$) combined as a single stream may flow into the second heat exchange device (300).

In one example, the flow mixer (600) can be formed in the pipe that the refrigerant flows, and, for example, located in the pipe formed so that at least two refrigerant streams ($F_D$) flowing out from the compression device (200) flow into the second heat exchange device (300). For instance, the flow mixer (600) can be formed such that at least two refrigerant streams ($F_D$) including the first and second refrigerant streams ($F_{D1}$, $F_{D2}$) flowing out from the compression device (200) flow into the flow mixer (600) and, after being mixed, flow into the second heat exchange device (300), where the mixed, single refrigerant stream ($F_M$) flowing into the second heat exchange device (300) may be heat exchanged with the second fluid stream ($F_{D2}$) flowing into the second heat exchange device (300).

In addition, as described above, the flow splitter (700) is a member for again dividing a single refrigerant stream ($F_M$) combined in the flow mixer (600) into at least two refrigerant streams ($F_D$), where the refrigerant stream ($F_M$) combined in the above mentioned flow mixer (600) may be divided into at least two refrigerant streams ($F_D$) in the flow splitter (700), and then flow into the above mentioned first heat exchange device (100).

In one example, the flow splitter (700) can be formed in the pipe that the refrigerant flows, and for example, formed at the front end of at least two pressure drop devices (400) or between at least two pressure drop devices (400). For example, when at least two refrigerant streams ($F_D$) flowing out from the compression device (200) are mixed via the flow mixer (600), and then flow into the second heat exchange device (300), and the mixed refrigerant stream ($F_M$) flows out from the second heat exchange device (300) after being heat exchanged in the second heat exchange device (300), the flow splitter (700) can be located in the pipe formed so that the mixed refrigerant stream ($F_M$) flowing out from the second heat exchange device (300) flows into at least two pressure drop devices (400) via the third heat exchange device (800). In this case, the refrigerant stream ($F_M$) mixed in the above mentioned flow mixer (600) flows out from the second heat exchange device (300) after being heat exchanged in the second heat exchange device (300), the mixed refrigerant stream ($F_M$) flows into the third heat exchange device (800), and the mixed refrigerant stream ($F_M$) flowing out after being heat exchanged in the third heat exchange device (800) passes through the flow splitter (700) to be again divided into at least two refrigerant streams ($F_D$), which may subsequently flow into the above mentioned first heat exchange device (100), respectively. In addition, the flow splitter (700) may be located between at least two pressure drop devices (400). For example, in the flow splitter (700), the single refrigerant stream depressurized via one pressure drop device, for example, the first pressure drop device (401) is divided into at least two refrigerant streams ($F_D$) via the flow splitter (700) prior to flowing into the other pressure drop devices, for example, the second and third pressure drip devices (402, 403), and then, one depressurized refrigerant stream, for example, the first refrigerant stream ($F_D$) may flow into the first heat exchange device (100) without passing through the pressure drop device, and the remaining depressurized refrigerant streams, for example, the second and third refrigerant streams ($F_{D2}$, $F_{D3}$) may be formed so as to flow into the first heat exchange device (100) after being introduced into the second and third pressure drop devices (402, 403), respectively.

In one example, as shown in FIG. 6, at least two refrigerant streams ($F_D$) including the first and second refrigerant streams ($F_{D1}$, $F_{D2}$) flowing out from the compression device (200) flow into the flow mixer (600) and, after being mixed, flow into the second heat exchange device (300), where the mixed refrigerant stream ($F_M$) flowing into the second heat exchange device (300) may be heat exchanged with the second fluid stream ($W_2$) flowing into the second heat exchange device (300), for example water to generate steam.

In addition, as in FIG. 6, the mixed refrigerant stream ($F_M$) flowing out after being heat exchanged in the second heat exchange device (300) may flow into the third heat exchange device (800), and then flow into the flow splitter (700), and the refrigerant stream flowing into the flow splitter (700) may be divided into at least two refrigerant streams ($F_D$) including the first and second refrigerant streams ($F_{D1}$, $F_{D2}$) to flow into at least two pressure drop devices (400), respectively.

In this case, in the third heat exchange device (800), the first refrigerant stream ($F_{D1}$) flowing out from the first heat exchange device (100) and the mixed refrigerant stream ($F_M$) flowing out from the second heat exchange device (300) may be heat exchanged with each other, and the second refrigerant stream ($F_{D2}$) flowing out from the first heat exchange device (100) and the mixed refrigerant stream ($F_M$) heat exchanged with the first refrigerant stream ($F_{D1}$) may be heat exchanged with each other.

In one example, the temperature of the first refrigerant stream ($F_{D1}$) flowing out from the third heat exchange device (800) and flowing into the compression device (200) and the temperature of the mixed refrigerant stream ($F_M$) flowing out from the second heat exchange device (300) and flowing into the third heat exchange device (800) can meet Formula 3 below.

$$1° C. \leq T_{R3Hin} - T_{R3Cout} \leq 30° C. \qquad \text{[Formula 3]}$$

In Formula 3 above, $T_{R3Cout}$ represents the temperature of the first refrigerant stream ($F_{D1}$) flowing out from the third heat exchange device (800) and flowing into the compression device (200), and $T_{R3Hin}$ represents the temperature of the mixed refrigerant stream ($F_M$) flowing out from the second heat exchange device (300) and flowing into the third heat exchange device (800).

That is, a difference between the temperature of the first refrigerant stream ($F_{D1}$) flowing out from the third heat exchange device (800) and flowing into the compression device (200) and the temperature of the mixed refrigerant stream ($F_M$) flowing out from the second heat exchange device (300) and flowing into the third heat exchange device (800), $T_{R3Hin} - T_{R3Cout}$, may be adjusted in the range of 1° C. to 30° C., for example, 3° C. to 30° C., 5° C. to 28° C., 10° C. to 30° C. or 5.0° C. to 15.0° C.

As the temperature of the first refrigerant stream ($F_{D1}$) flowing out from the third heat exchange device (800) and flowing into the compression device (200) and the temperature of the mixed refrigerant stream ($F_M$) flowing out from the second heat exchange device (300) and flowing into the third heat exchange device (800) meet Formula 3 above, the temperature of the refrigerant stream flowing into the compression device (200) can be sufficiently raised so as to prevent some of the above mentioned vaporization phenomenon and thus the heat exchange efficiency of the heat recovery apparatus (10) can be raised.

If the temperature of the first refrigerant stream ($F_{D1}$) flowing out from the third heat exchange device (800) and flowing into the compression device (200) and the temperature of the mixed refrigerant stream ($F_M$) flowing out from the second heat exchange device (300) and flowing into the third heat exchange device (800) satisfy Formula 3 above, they may be variously modulated depending on the types of processes to be applied and conditions of each process, without any limitation. In one example, the first refrigerant stream ($F_{D1}$) flowing out from the third heat exchange device (800) and flowing into the compression device (200) may flow into the compression device (200) at a temperature of 60° C. to 120° C., for example, 68° C. to 82° C., 75° C. to 90° C. or 90° C. to 120° C., but is not particularly limited. In addition, the temperature of the mixed refrigerant stream ($F_M$) flowing out from the second heat exchange device (300) and flowing into the third heat exchange device (800) may be 100° C. to 170° C., for example, 110° C. to 125° C., 125° C. to 140° C. or 170 to 150° C., but is not particularly limited thereto.

At least two refrigerant streams ($F_D$) flowing out from the third heat exchange device (800) and flowing into the compression device (200) may be vapor phase streams, and the volume fraction of the vapor phase streams in the at least two refrigerant streams may be 0.9 to 1.0, for example, 0.95 to 1.0, preferably from 0.99 to 1.0.

The mixed refrigerant stream ($F_M$) flowing out from the second heat exchange device (300) and flowing into the third heat exchange device (800) may be a liquid phase stream, and the volume fraction of the liquid phase stream in the mixed refrigerant stream may be 0.9 to 1.0, for example, 0.95 to 1.0, preferably 0.99 to 1.0.

As described above, the heat exchange device of the present application may be one assembly that at least two heat exchangers are combined or a heat exchange unit including two or more heat exchangers and a compression device (200) may be one assembly that at least two compressors are combined or a compression unit including at least two compressors.

In one example, the first heat exchange device (100) and the third heat exchange device (800) may comprise at least two heat exchangers and the compression device (200) may comprise at least two compressors.

FIG. 8 is a view schematically showing one embodiment of the heat recovery apparatus (10) having two refrigerant streams of the present application.

As shown in FIG. 8, in the heat recovery apparatus (10) of the present application, the first heat exchange device (100) may comprise the first-first heat exchanger (101) and the first-second heat exchanger (102), the third heat exchange device (800) may comprise a third-first heat exchanger (801) and a third-second heat exchanger (802), the compression device (200) may comprise the first compressor (201) and the second compressor (202), and the pressure drop device (400) may comprise the first pressure drop device (401) and the second pressure drop device (402).

In this case, as shown in FIG. 8, the first fluid stream ($W_1$) may flow into the first-first heat exchanger (101), the first fluid stream ($W_1$) flowing out from the first-first heat exchanger (101) may flow into the first-second heat exchanger (102), the first refrigerant stream ($F_{D1}$) may flow into the first-first heat exchanger (101), and the second refrigerant stream ($F_{D2}$) may flow into the first-second heat exchanger (102).

Accordingly, the first refrigerant stream ($F_{D1}$) flowing into the first-first heat exchanger (101) may be heat exchanged with the first fluid stream ($W_1$) flowing into the first-first heat exchanger (101), and the second refrigerant stream ($F_{D2}$) flowing into the first-second heat exchanger (102) may be heat exchanged with the first fluid stream ($W_1$) flowing out from the first-first heat exchanger (101) and flowing into the first-second heat exchanger (102). In addition, the first refrigerant stream ($F_{D1}$) flowing out from the first-first heat exchanger (101) may flow into the first compressor (201) after being introduced into the third-first heat exchanger (801), and the second refrigerant stream ($F_{D2}$) flowing out from the first-second heat exchanger (102) may flow into the second compressor (202) after being introduced into the third-second heat exchanger (802).

At this time, the first refrigerant stream ($F_{D1}$) flowing into the first-first heat exchanger (101), as described above, is adjusted to have a relatively high temperature and pressure, compared to the second refrigerant stream ($F_{D2}$) in the first pressure drop device (401) and then flows into the first heat exchange device (100), whereby the temperature and pressure of the first refrigerant stream ($F_{D1}$) flowing into the compression device (200), for example the first compressor (201) after heat exchange in the third-first heat exchanger (801) can be maintained high enough to reduce the energy required for compression.

Furthermore, as in FIG. 8, the first refrigerant stream ($F_{D1}$) flowing out from the first compressor (201) and the second refrigerant stream ($F_{D2}$) flowing out from the second compressor (202) may flow into the flow mixer (600) and, after being mixed, flow into the second heat exchange device (300), and the mixed refrigerant stream ($F_M$) flowing into the second heat exchange device (300) may be heat exchanged with the second fluid stream ($W_2$) flowing into the second heat exchange device (300), for example water to generate steam.

The mixed refrigerant stream ($F_M$) flowing out after being heat exchanged with the second fluid stream ($W_2$) in the second heat exchange device (300) may flow into the third-first heat exchanger (801), whereby the first refrigerant stream ($F_{D1}$) flowing out from the first-first heat exchanger (101) and the mixed refrigerant stream ($F_M$) flowing out from the second heat exchange device (300) may be heat exchanged in the third-first heat exchanger (801). In addition, the mixed refrigerant stream flowing out after being heat exchanged with the first refrigerant stream ($F_{D1}$) in the third-first heat exchanger (801) may flow into the third-second heat exchanger (802), whereby the second refrigerant stream ($F_{D2}$) flowing out from the first-second heat exchanger (102) and the mixed refrigerant stream ($F_M$) flowing out from the third-first heat exchanger (801) may be heat exchanged in the third-second heat exchanger (802).

Furthermore, as in FIG. 8, the mixed refrigerant stream ($F_M$) flowing out after being heat exchanged in the third-second heat exchanger (802) may flow into the flow splitter (700), and the mixed refrigerant stream ($F_M$) flowing into the flow splitter (700) may be divided into the first refrigerant stream ($F_{D1}$) and the second refrigerant stream ($F_{D2}$) in the flow splitter (700).

The first refrigerant stream ($F_{D1}$) divided in the flow splitter (700) flows into the first pressure drop device (401), so that it may be depressurized to have a relatively higher temperature and pressure than the second refrigerant stream ($F_{D2}$), and the second refrigerant stream ($F_{D2}$) divided in the flow splitter (700) flows into the second pressure drop device (402), so that it may be depressurized to have a relatively lower temperature and pressure than the first refrigerant stream ($F_{D1}$).

The first refrigerant stream ($F_{D1}$) flowing out after being depressurized in the first pressure drop device (401) as above may flow into the first-first heat exchanger (101), and the second refrigerant stream ($F_{D2}$) flowing out after being depressurized in the second pressure drop device (402) may flow into the first-second heat exchanger (102).

FIG. 9 is a view schematically showing one embodiment of the heat recovery apparatus (10) having three refrigerant streams of the present application.

As shown in FIG. 9, in the heat recovery apparatus (10) of the present application, the first heat exchange device (100) may comprise the first-first heat exchanger (101), the first-second heat exchanger (102) and the first-third heat exchanger (103), the third heat exchange device (800) may comprise the third-first heat exchanger (801), the third-second heat exchanger (802) and a third-third heat exchanger (803), the compression device (200) may comprise the first compressor (201), the second compressor (202) and the third compressor (203), and the pressure drop device (400) may comprise the first pressure drop device (401), the second pressure drop device (402) and the third pressure drop device (403).

In this case, as shown in FIG. 9, the first fluid stream ($W_1$) may flow into the first-first heat exchanger (101), the first fluid stream ($W_1$) flowing out from the first-first heat exchanger (101) may flow into the first-second heat exchanger (102) and the first fluid stream ($W_1$) flowing out from the first-second heat exchanger (102) may flow into the first-third heat exchanger (103). In addition, the first refrigerant stream ($F_{D1}$) may flow into the first-first heat exchanger (101), the second refrigerant stream ($F_{D2}$) may flow into the first-second heat exchanger (102) and the third refrigerant stream ($F_{D3}$) may flow into the first-third heat exchanger (103).

Accordingly, the first refrigerant stream ($F_{D1}$) flowing into the first-first heat exchanger (101) may be heat exchanged with the first fluid stream ($W_1$) flowing into the first-first heat exchanger (101), the second refrigerant stream ($F_{D2}$) flowing into the first-second heat exchanger (102) may be heat exchanged with the first fluid stream ($W_1$) flowing out from the first-first heat exchanger (101) and flowing into the first-second heat exchanger (102) and the third refrigerant stream ($F_{D3}$) flowing into the first-third heat exchanger (103) may be heat exchanged with the first fluid stream ($W_1$) flowing out from the first-second heat exchanger (102) and flowing into the first-third heat exchanger (103). In addition, the first refrigerant stream ($F_{D1}$) flowing out from the first-first heat exchanger (101) may flow into the first compressor (201) after being introduced into the third-first heat exchanger (801), the second refrigerant stream ($F_{D2}$) flowing out from the first-second heat exchanger (102) may flow into the second compressor (202) after being introduced into the third-second heat exchanger (802) and the third refrigerant stream ($F_{D3}$) flowing out from the first-third heat exchanger (103) may flow into the third compressor (203) after being introduced into the third-third heat exchanger (803).

At this time, the first refrigerant stream ($F_{D1}$) flowing into the first-first heat exchanger (101), as described above, is adjusted to have a relatively high temperature and pressure, compared to the second refrigerant stream ($F_{D2}$) and the third refrigerant stream ($F_{D3}$) in the first pressure drop device (401) and then flows into the first heat exchange device (100), whereby the temperature and pressure of the first refrigerant stream ($F_{D1}$) flowing into the compression device (200), for example the first compressor (201) after heat exchange in the third-first heat exchanger (801) can be maintained high enough to reduce the energy required for compression.

Furthermore, as in FIG. 9, the first refrigerant stream ($F_{D1}$) flowing out from the first compressor (201), the second refrigerant stream ($F_{D2}$) flowing out from the second compressor (202) and the third refrigerant stream ($F_{D3}$) flowing out from the third compressor (203) may flow into the flow mixer (600) and, after being combined, flow into the second heat exchange device (300), and the mixed refrigerant stream ($F_M$) flowing into the second heat exchange device (300) may be heat exchanged with the second fluid stream ($W_2$) flowing into the second heat exchange device (300), for example water to generate steam.

The mixed refrigerant stream ($F_M$) flowing out from the second heat exchange device (300) may flow into the third-first heat exchanger (801), whereby the first refrigerant stream ($F_{D1}$) flowing out from the first-first heat exchanger (101) and the mixed refrigerant stream ($F_M$) flowing out from the second heat exchange device may be heat exchanged in the third-first heat exchanger (801). The mixed refrigerant stream ($F_M$) flowing out from the third-first heat exchanger (801) may flow into the third-second heat exchanger (802), whereby the second refrigerant stream ($F_{D2}$) flowing out from the first-second heat exchanger (102) and the mixed refrigerant stream ($F_M$) flowing out from the third-first heat exchanger (801) may be heat exchanged in the third-second heat exchanger (802). In addition, the mixed refrigerant stream ($F_M$) flowing out from the third-second heat exchanger (802) may flow into the third-third heat exchanger (803), whereby the third refrigerant stream ($F_{D3}$) flowing out from the first-third heat exchanger (103) and the mixed refrigerant stream ($F_M$) flowing out from the third-second heat exchanger (802) may be heat exchanged in the third-third heat exchanger (803).

Furthermore, as in FIG. 9, the mixed refrigerant stream ($F_M$) flowing out from the third-third heat exchanger (803) may flow into the flow splitter (700), and the mixed refrigerant stream ($F_M$) flowing into the flow splitter (700) may be divided into the first refrigerant stream ($F_{D1}$), the second refrigerant stream ($F_{D2}$) and the third refrigerant stream ($F_{D3}$) in the flow splitter (700).

The first refrigerant stream ($F_{D1}$) divided in the flow splitter (700) flows into the first pressure drop device (401), so that it may be depressurized to have a relatively higher temperature and pressure than the second refrigerant stream ($F_{D2}$) and the third refrigerant stream ($F_{D3}$), the second refrigerant stream ($F_{D2}$) divided in the flow splitter (700) flows into the second pressure drop device (402), so that it may be depressurized to have a relatively lower temperature and pressure than the first refrigerant stream ($F_{D1}$), and the third refrigerant stream ($F_{D3}$) divided in the flow splitter (700) flows into the third pressure drop device (403), so that it may be depressurized to have a relatively lower temperature and pressure than the first and second refrigerant streams ($F_{D1}$, $F_{D2}$).

The first refrigerant stream ($F_{D1}$) flowing out after being depressurized in the first pressure drop device (401) as above may flow into the first-first heat exchanger (101), the second refrigerant stream ($F_{D2}$) flowing out after being depressurized in the second pressure drop device (402) may flow into the first-second heat exchanger (102) and the third refrigerant stream ($F_{D3}$) flowing out from the third pressure drop device (403) may flow into the first-third heat exchanger (103).

FIG. 10 is a view schematically showing one embodiment of the heat recovery apparatus (10) having four refrigerant streams of the present application.

As shown in FIG. 10, in the heat recovery apparatus (10) of the present application, the first heat exchange device (100) may comprise the first-first heat exchanger (101), the first-second heat exchanger (102), the first-third heat exchanger (103) and the first-fourth heat exchanger (104), the third heat exchange device (800) may comprise the third-first heat exchanger (801), the third-second heat exchanger (802), the third-third heat exchanger (803) and a third-fourth heat exchanger (804), the compression device (200) may comprise the first compressor (201), the second compressor (202), the third compressor (203) and the fourth compressor (204), and the pressure drop device (400) may comprise the first pressure drop device (401), the second pressure drop device (402), the third pressure drop device (403) and the fourth pressure drop device (404).

In this case, as shown in FIG. 10, the first fluid stream ($W_1$) may flow into the first-first heat exchanger (101) and the first fluid stream ($W_1$) flowing out from the first-first heat exchanger (101) may flow into the first-second heat exchanger (102). The first fluid stream ($W_1$) flowing out from the first-second heat exchanger (102) may flow into the first-third heat exchanger (103) and the first fluid stream ($W_1$) flowing out from the first-third heat exchanger (103) may flow into the first-fourth heat exchanger (104). In addition, the first refrigerant stream ($F_{D1}$) may flow into the first-first heat exchanger (101), the second refrigerant stream ($F_{D2}$) may flow into the first-second heat exchanger (102), the third refrigerant stream ($F_{D3}$) may flow into the first-third heat exchanger (103) and the fourth refrigerant stream ($F_{D4}$) may flow into the first-fourth heat exchanger (104).

Accordingly, the first refrigerant stream ($F_{D1}$) flowing into the first-first heat exchanger (101) may be heat exchanged with the first fluid stream ($W_1$) flowing into the first-first heat exchanger (101), the second refrigerant stream ($F_{D2}$) flowing into the first-second heat exchanger (102) may be heat exchanged with the first fluid stream ($W_1$) flowing out from the first-first heat exchanger (101) and flowing into the first-second heat exchanger (102), the third refrigerant stream ($F_{D3}$) flowing into the first-third heat exchanger (103) may be heat exchanged with the first fluid stream ($W_1$) flowing out from the first-second heat exchanger (102) and flowing into the first-third heat exchanger (103) and the fourth refrigerant stream ($F_{D4}$) flowing into the first-fourth heat exchanger (104) may be heat exchanged with the first fluid stream ($W_1$) flowing out from the first-third heat exchanger (103) and flowing into the first-fourth heat exchanger (104). In addition, the first refrigerant stream ($F_{D1}$) flowing out from the first-first heat exchanger (101) may flow into the first compressor (201) after being introduced into the third-first heat exchanger (801), the second refrigerant stream ($F_{D2}$) flowing out from the first-second heat exchanger (102) may flow into the second compressor (202) after being introduced into the third-second heat exchanger (802), the third refrigerant stream ($F_{D3}$) flowing out from the first-third heat exchanger (103) may flow into the third compressor (203) after being introduced into the third-third heat exchanger (803) and the fourth refrigerant stream ($F_{D4}$) flowing out from the first-fourth heat exchanger (104) may flow into the fourth compressor (204) after being introduced into the third-fourth heat exchanger (804).

At this time, the first refrigerant stream ($F_{D1}$) flowing into the first-first heat exchanger (101), as described above, is adjusted to have a relatively high temperature and pressure, compared to the second refrigerant stream ($F_{D2}$), the third refrigerant stream ($F_{D3}$) and the fourth refrigerant stream ($F_{D4}$) in the first pressure drop device (401) and then flows into the first heat exchange device (100), whereby the temperature and pressure of the first refrigerant stream ($F_{D1}$) flowing into the compression device (200), for example the first compressor (201) after heat exchange in the third-first heat exchanger (801) can be maintained high enough to reduce the energy required for compression.

Furthermore, as in FIG. 10, the first refrigerant stream ($F_{D1}$) flowing out from the first compressor (201), the second refrigerant stream ($F_{D2}$) flowing out from the second compressor (202), the third refrigerant stream ($F_{D3}$) flowing out from the third compressor (203) and the fourth refrigerant stream ($F_{D4}$) flowing out from the fourth compressor (204) may flow into the flow mixer (600) and, after being mixed, flow into the second heat exchange device (300), and the mixed refrigerant stream ($F_M$) flowing into the second heat exchange device (300) may be heat exchanged with the second fluid stream ($W_2$) flowing into the second heat exchange device (300), for example water to generate steam.

In addition, the mixed refrigerant stream ($F_M$) flowing out from the second heat exchange device (300) may flow into the third-first heat exchanger (801), whereby the first refrigerant stream ($F_{D1}$) flowing out from the first-first heat exchanger (101) and the mixed refrigerant stream ($F_M$) flowing out from first-second heat exchanger (102) may be heat exchanged in the third-first heat exchanger (801). The mixed refrigerant stream ($F_M$) flowing out from the third-first heat exchanger (801) may flow into the third-second heat exchanger (802), whereby the second refrigerant stream ($F_{D2}$) flowing out from the first-second heat exchanger (102) and the mixed refrigerant stream ($F_M$) flowing out from the third-first heat exchanger (801) may be heat exchanged in the third-second heat exchanger (802). The mixed refrigerant stream ($F_M$) flowing out from the third-second heat exchanger (802) may flow into the third-third heat exchanger (803), whereby the third refrigerant stream ($F_{D3}$) flowing out from the first-third heat exchanger (103) and the mixed refrigerant stream ($F_M$) flowing out from the third-second heat exchanger (802) may be heat exchanged in the third-third heat exchanger (803). In addition, the mixed refrigerant stream ($F_M$) flowing out from the third-third heat exchanger (803) may flow into the third-fourth heat exchanger (804), whereby the fourth refrigerant stream ($F_{D4}$) flowing out from the first-fourth heat exchanger (104) and the mixed refrigerant stream ($F_M$) flowing out from the third-third heat exchanger (803) may be heat exchanged in the third-fourth heat exchanger (804).

Furthermore, as in FIG. 10, the mixed refrigerant stream ($F_M$) flowing out from the third-fourth heat exchanger (804) may flow into the flow splitter (700), and the mixed refrigerant stream ($F_M$) flowing into the flow splitter (700) may be divided into the first refrigerant stream ($F_{D1}$), the second refrigerant stream ($F_{D2}$), the third refrigerant stream ($F_{D3}$) and the fourth refrigerant stream ($F_{D4}$) in the flow splitter (700).

The first refrigerant stream ($F_{D1}$) divided in the flow splitter (700) flows into the first pressure drop device (401), so that it may be depressurized to have a relatively higher temperature and pressure than the second, third and fourth refrigerant streams ($F_{D2}$, $F_{D3}$, $F_{D4}$), and the second refrigerant stream ($F_{D2}$) divided in the flow splitter (700) flows into the second pressure drop device (402), so that it may be depressurized to have a relatively lower temperature and pressure than the first refrigerant stream ($F_{D1}$). In addition, the third refrigerant stream ($F_{D3}$) divided in the flow splitter (700) flows into the third pressure drop device (403), so that it may be depressurized to have a relatively lower temperature and pressure than the first and second refrigerant streams ($F_{D1}$, $F_{D2}$), and the fourth refrigerant stream ($F_{D4}$) divided in the flow splitter (700) flows into the fourth pressure drop device (404), so that it may be depressurized to have a relatively lower temperature and pressure than the first, second and third refrigerant streams ($F_{D1}$, $F_{D2}$, $F_{D3}$).

The first refrigerant stream ($F_{D1}$) flowing out after being depressurized in the first pressure drop device (401) as above may flow into the first-first heat exchanger (101), and the second refrigerant stream ($F_{D2}$) flowing out after being depressurized in the second pressure drop device (402) may flow into the first-second heat exchanger (102). In addition, the third refrigerant stream ($F_{D3}$) flowing out after being depressurized the third pressure drop device (403) may flow into the first-third heat exchanger (103), and the fourth refrigerant stream ($F_{D4}$) flowing out from the fourth pressure drop device (404) may flow into the first-fourth heat exchanger (104).

Another embodiment of the present application provides a heat recovery method.

The exemplary heat recovery method may be carried out by using the aforementioned heat recovery apparatus (10), through which since steam can be generated, as mentioned above, by using the low-grade heat source of less than 120° C. discharged in industrial sites or various chemical processes, for example, processes for producing the petrochemical products, without being discarded, and the produced steam can be utilized in various processes, it is possible to reduce the amount of high temperature steam as the external heat source for use in a reactor or distillation column and to maximize the energy-saving efficiency. In addition, at least two refrigerant streams may be heat exchanged with the waste heat stream by dividing one refrigerant stream in a cascade method and circulating the resulting streams, and the pressure of the refrigerant stream flowing into the compressor can be adjusted relatively high compared to the heat recovery apparatus (10) using a single refrigerant stream, so that it is possible to reduce the amount of energy required for compression in the compressor.

The heat recovery method by one embodiment of the present application comprises a refrigerant circulation step, a first heat exchange step and a second heat exchange step and a third heat exchange step.

In one example, the heat recovery method comprises the refrigerant circulation step that the refrigerant stream is circulated to pass through the first heat exchange device (100), the compression device (200), the second heat exchange device (300) and the pressure drop device (400) in turn. For example, the heat recovery method may comprise the refrigerant circulation step which comprises (i) introducing at least two refrigerant streams ($F_D$) including a refrigerant stream and a second refrigerant stream into the first heat exchange device (100), (ii) introducing at least two refrigerant streams ($F_D$) flowing out from the first heat exchange device (100) into the compression device (200), (iii) mixing at least two refrigerant streams ($F_D$) including the first and second refrigerant streams ($F_{D1}$, $F_{D2}$) flowing out from the compression device (200) and then introducing the mixed refrigerant stream into the second heat exchange device (300), (iv) introducing the mixed refrigerant stream ($F_M$) flowing out from the second heat exchange device (300) into the pressure drop device (400), (v) dividing the refrigerant stream flowing out from the pressure drop device (400) into at least two refrigerant streams ($F_D$) including the first refrigerant stream ($F_{D1}$) and the second refrigerant stream ($F_{D2}$), and (vi) introducing at least two refrigerant streams ($F_D$) including the divided first refrigerant stream ($F_{D1}$) and second refrigerant stream ($F_{D2}$) into the first heat exchange device (100).

In addition, the heat recovery method comprises the first heat exchange step including heat exchanging the first refrigerant stream ($F_D$) flowing into the first heat exchange device (100) with the first fluid stream ($W_1$) flowing into the first heat exchange device (100); the second heat exchange step including heat exchanging the first fluid stream ($W_1$) heat exchanged with the first refrigerant stream ($F_{D1}$) with the second refrigerant stream ($F_{D2}$) flowing into the first heat exchange device (100); and the third heat exchange step of heat exchanging the mixed refrigerant stream ($F_M$) flowing into the second heat exchange device (300) with the second fluid stream ($W_2$) flowing into the second heat exchange device (300).

The refrigerant circulation step, the first heat exchange step, the second heat exchange step and the third heat exchange step may be made up sequentially or independently of each other in any order. In addition, since the processes (i) to (vi) in the refrigerant circulation step are cyclic processes, any process can be first carried out, as long as the refrigerant streams can be circulated as above.

In the exemplary heat recovery method of the present application, the temperature of the first refrigerant stream ($F_{D1}$) flowing out from the first heat exchange device (100) and the temperature of the first fluid stream ($W_1$) flowing into the first heat exchange device (100) can meet Formula 1 below.

$$1° C. \leq T_{F1} - T_{R1} \leq 35° C.$$ [Formula 1]

In Formula 1 above, $T_{F1}$ represents the temperature of the first fluid stream ($W_1$) flowing into the first heat exchange device (100), and $T_{R1}$ represents the temperature of the first refrigerant stream ($F_{D1}$) flowing out from the first heat exchanger (100).

As the temperature of the first refrigerant stream ($F_{D1}$) flowing out from the heat exchange device (100) and the temperature of the first fluid stream ($W_1$) flowing into the first heat exchange device (100) satisfy Formula 1 above, the first refrigerant stream ($F_{D1}$), which is first of all heat exchanged with the waste heat stream in the early stage, may flow into a compression device to be described later in a state of high temperature and high pressure, compared to relatively later stage streams of multistage refrigerant streams, for example, the second refrigerant stream ($F_{D2}$), the third refrigerant stream ($F_{D3}$) or the fourth refrigerant stream ($F_{D4}$), which are subsequently heat exchanged with the waste heat stream.

Accordingly, it is possible to reduce the amount of energy used by the compressor. Since the detailed description regarding the conditions of the temperature of the first refrigerant stream ($F_{D1}$) flowing out from the heat exchange device (100) and the temperature of the first fluid stream ($W_1$) flowing into the first heat exchange device (100) is the same as explained in the above mentioned heat recovery apparatus (10), it will be omitted.

In the heat recovery method of the present application, the ratio of the pressure of the first refrigerant stream ($F_{D1}$) flowing out from the first heat exchange device (100) and flowing into the compression device (200) and the pressure of the first refrigerant stream ($F_{D1}$) flowing out from the compression device (200) can satisfy Formula 2 below.

$$2 \leq P_{C1}/P_{H1} \leq 6$$ [Formula 2]

In Formula 2 above, $P_{C1}$ represents the pressure (bar) of the first refrigerant stream ($F_{D1}$) flowing out from the compression device (200), and $P_{H1}$ represents the pressure (bar) of the first refrigerant stream ($F_{D1}$) flowing out from the first heat exchange device (100) and flowing into the compression device (200).

As the ratio of the pressure of the first refrigerant stream ($F_{D1}$) flowing out from the first heat exchange device (100) and flowing into the compression device (200) and the pressure of the first refrigerant stream ($F_{D1}$) flowing out from the compression device (200) satisfies the Formula 2, the amount of energy per unit mass required in the compressor may be reduced when compressing the refrigerant in the first heat exchange device (100). In the heat recovery method of the present application, since the detailed description regarding the pressure of the first refrigerant stream ($F_{D1}$) flowing out from the first heat exchange device (100) and flowing into the compression device (200) and the pressure of the first refrigerant stream ($F_{D1}$) flowing out from the compression device (200) is the same as explained in the above mentioned heat recovery apparatus (10), it will be omitted.

In addition, in the heat recovery method of the present application, since the detailed description of the specific temperature, pressure and flow conditions is the same as described above in the heat recovery apparatus (10), it will be omitted.

In another embodiment of the heat recovery method of the present application, the refrigerant circulating in the refrigerant circulation step to pass through the first heat exchange device (100), the compression device (200), the second heat exchange device (200) and the pressure drop device (400) in turn may be a refrigerant that the slope of the tangent line of the saturated vapor curve in the temperature-entropy diagram has a positive slope, and for example, the slope of the tangent line of the saturated vapor curve having the horizontal axis of entropy (J/kg·K) and the vertical axis of temperature (° C.) in the temperature-entropy diagram of the refrigerant may be 1 to 3 at 50° C. to 130° C.

Also, in this case, the refrigerant circulation step may further comprise introducing at least two refrigerant streams ($F_D$) flowing out from the first heat exchange device (100) into the third heat exchange device (800) and then introducing it into the compression device (200), and introducing the mixed refrigerant stream ($F_M$) flowing out from the second heat exchange device (300) into the third heat exchange device (800) and then introducing it into the pressure drop device (400). In one example, the heat recovery method of the present application may further comprise a fourth heat exchange step of heat exchanging the first refrigerant stream ($F_{D1}$) flowing out from the first heat exchange device (100) and the mixed refrigerant stream ($F_M$) flowing out from the second heat exchange device (300) in the third heat exchange device (800); and a fifth heat exchange step of heat exchanging the mixed refrigerant stream ($F_M$) heat exchanged with the first refrigerant stream ($F_{D1}$) and the second refrigerant stream ($F_{D2}$) flowing out from the first heat exchange device (100) in the third heat exchange device (800).

Therefore, as described above, it is possible to prevent some vaporization phenomenon of the refrigerant that occurs during the isentrophic compression of the refrigerant, and to raise the heat exchange efficiency of the heat recovery apparatus (10).

In one example, the temperature of the first refrigerant stream ($F_{D1}$) flowing out from the third heat exchange device (800) and flowing into the compression device (200) and the temperature of the mixed refrigerant stream ($F_M$) flowing out from the second heat exchange device (300) and flowing into the third heat exchange device (800) can meet Formula 3 below.

$$1° C. \leq T_{R3Hin} - T_{R3Cout} \leq 30° C. \quad [\text{Formula 3}]$$

In Formula 3 above, $T_{R3Cout}$ represents the temperature of the first refrigerant stream ($F_{D1}$) flowing out from the third heat exchange device (800) and flowing into the compression device (200), and $T_{R3Hin}$ represents the temperature of the mixed refrigerant stream ($F_M$) flowing out from the second heat exchange device (300) and flowing into the third heat exchange device (800).

As the temperature of the first refrigerant stream ($F_{D1}$) flowing out from the third heat exchange device (800) and flowing into the compression device (200) and the temperature of the mixed refrigerant stream ($F_M$) flowing out from the second heat exchange device (300) and flowing into the third heat exchange device (800) meet Formula 3 above, the temperature of the refrigerant stream flowing into the compression device (200) can be sufficiently raised so as to prevent some of the above mentioned vaporization phenomenon and thus the heat exchange efficiency of the heat recovery apparatus (10) can be raised. In addition, in the heat recovery method, since the detailed description of the specific temperature, pressure and flow conditions is the same as described above in the heat recovery apparatus (10), it will be omitted.

In one example, in another embodiment of the heat recovery method, the second fluid ($W_2$) flowing into the second heat exchange device (300) may be water, and an exemplary heat recovery method of the present application may further comprise a steam generation step of discharging the water heat exchanged with the refrigerant stream flowing into the second heat exchange device (300) as steam.

Also, the other embodiment of the heat recovery method may further comprise a step of condensing and discharging the first fluid stream ($W_1$) flowing out from the first heat exchange device (100).

The heat recovery apparatus (10) and method of the present application can be applied to a variety of petrochemical processes.

For example, in the case of an oxo reaction process on producing n-butanol, wherein the temperature of waste heat generated in the process is about 85° C., the heat quantity of about 7.6 Gcal/hr in this case is discarded, so that it can be applied to the oxo reaction process. In addition, in the case of the manufacturing process of cumene through the alkylation reactions, the heat quantity of about 6.8 Gcal/hr is discarded, so that it can be also applied to the manufacturing process of cumene. Furthermore, in the production process of acrylic acid, the temperature of waste heat generated in the absorber is about 75° C., the heat quantity of about 1.6 to 3.4 Gcal/hr is discarded, so that it can be also applied the production process of acrylic acid.

Effects of Invention

According to the heat recovery apparatus and method of the present application, since the low-grade heat source of less than 120° C. discharged in industrial sites or various chemical processes, for example, processes for producing the petrochemical products may be used without being discarded to produce steam and the produced steam may be utilized in various processes, it is not only possible to reduce the amount of high temperature steam as the external heat source for use in a reactor or distillation column and to maximize the energy-saving efficiency, but also at least two refrigerant streams may be heat exchanged with the waste heat stream by dividing one refrigerant stream in a cascade method and circulating the resulting streams, and the pressure of the refrigerant stream flowing into the compressor can be adjusted relatively high compared to the heat recovery apparatus using the only one refrigerant stream, so that it is possible to reduce the amount of energy required for compression in the compressor.

BRIEF DESCRIPTION OF DRAWINGS

FIG. 1 is a view schematically showing a conventional waste heat treatment device.

FIG. 2 and FIG. 6 are views schematically illustrating an exemplary heat recovery apparatus of the present application.

FIG. 3 and FIG. 8 are views schematically showing one embodiment of the heat recovery apparatus of the present application, two refrigerant streams.

FIG. 4 and FIG. 9 are views schematically showing one embodiment of the heat recovery apparatus of the present application, three refrigerant streams.

FIG. 5 and FIG. 10 are views schematically showing one embodiment of the heat recovery apparatus of the present application, four refrigerant streams.

FIG. 7 is a graph illustratively showing the temperature-entropy diagram of the refrigerant of the present application.

FIG. 11 and FIG. 12 are views schematically showing the heat recovery apparatus according to a comparative example of the present application.

10: heat recovery device
100: first heat exchange device
101: first-first heat exchanger
102: first-second heat exchanger
103: first-third heat exchanger
104: first-fourth heat exchanger
200: compression apparatus
201: first compressor
202: second compressor
203: third compressor
204: fourth compressor
300: second heat exchange device
400: at least two pressure drop devices
401: first pressure drop device
402: second pressure drop device
403: third pressure drop device
404: fourth pressure drop device
500: storage tank
600: flow mixer
700: flow splitter
$F_D$: at least two refrigerant streams
$F_{D1}$: first refrigerant stream
$F_{D2}$: second refrigerant stream
$F_{D3}$: third refrigerant stream
$F_{D4}$: fourth refrigerant stream $F_M$: mixed refrigerant stream
$W_1$: first fluid stream
$W_2$: second fluid stream

BEST MODE FOR CARRYING OUT INVENTION

Hereinafter, the present application is explained in more detail via examples according to the present invention and comparative examples not according to the present application, but the scope of the present application is not limited by the examples set forth below.

Example 1

Steam was generated using the heat recovery apparatus of FIG. 4.

Three refrigerant (1,1,1,3,3-pentafluoropropane, R245fa) streams were circulated to sequentially pass through the first heat exchange device, the compression device, the second heat exchange device and at least two control valves, respectively. Specifically, the heat exchange was allowed by introducing the first refrigerant stream with a state of 90.0° C., 9.3 kgf/cm²g (10.1 bar) and a gas volume fraction of 0.0 into the first heat exchanger in a flow rate of 30,000 kg/hr and at the same time introducing the waste heat stream with a state of 110.0° C., 1.0 kgf/cm²g and a gas volume fraction of 0.0 into the first-first heat exchanger in a flow rate of 100,000 kg/hr. After the heat exchange the waste heat stream was effused in a state of 100.3° C., 1.0 kgf/cm²g and a gas volume fraction of 0.0 in a flow rate of 100,000 kg/hr from the first-first heat exchanger and the heat exchanged waste heat stream was introduced into the first-second heat exchanger. At the same time, the heat exchange was allowed by introducing the second refrigerant stream with a state of 80.0° C., 7.1 kgf/cm²g (7.94 bar) and a gas volume fraction of 0.0 into the first-second heat exchanger in a flow rate of 29,000 kg/hr. After the heat exchange the waste heat stream was effused in a state of 90.1° C., 1.0 kgf/cm²g and a gas volume fraction of 0.0 in a flow rate of 100,000 kg/hr from the first-second heat exchanger and the heat exchanged waste heat stream was introduced into the first-third heat exchanger. At the same time, the heat exchange was allowed by introducing the third refrigerant stream with a state of 70.0° C., 5.2 kgf/cm²g (6.1 bar) and a gas volume fraction of 0.0 into the first-third heat exchanger in a flow rate of 26,000 kg/hr. After the heat exchange the waste heat stream was effused in a state of 80.3° C., 1.0 kgf/cm²g and a gas volume fraction of 0.0 in a flow rate of 100,000 kg/hr from the first-third heat exchanger. The first refrigerant stream flowing out from the first-first heat exchanger after heat exchange was effused in a state of 90.0° C., 9.3 kgf/cm²g (10.1 bar) and a gas volume fraction of 1.0, and then introduced into the first compressor. In addition, the second refrigerant stream flowing out from the first-second heat exchanger after heat exchange was effused in a state of 80.1° C., 7.1 kgf/cm²g (7.94 bar) and a gas volume fraction of 1.0, and then introduced into the second compressor, and the third refrigerant stream flowing out from the first-third heat exchanger after heat exchange was effused in a state of 70.3° C., 5.2 kgf/cm²g (6.1 bar) and a gas volume fraction of 1.0, and then introduced into the third compressor.

The first refrigerant stream compressed in the first compressor was effused in a state of 125.0° C., 20.7 kgf/cm²g (21.3 bar) and a gas volume fraction of 0.83 from the first compressor, where the amount of work used in the first compressor was 146,754.0 W. The second refrigerant stream compressed in the second compressor was effused in a state of 125.0° C., 20.7 kgf/cm²g (21.3 bar) and a gas volume fraction of 0.79 from the second compressor, where the amount of work used in the second compressor was 183,232.0 W. The third refrigerant stream compressed in the third compressor was effused in a state of 125.0° C., 20.7 kgf/cm²g (21.3 bar) and a gas volume fraction of 0.75 from the third compressor, where the amount of work used in the third compressor was 202,341.0 W.

Thereafter, the first, second and third refrigerant streams flowing out from the first compressor, the second compressor and the third compressor, respectively were introduced into the flow mixer, mixed and the mixed refrigerant stream with a state of 125.0° C., 20.7 kgf/cm²g (21.3 bar) and a gas volume fraction of 0.79 was introduced into the condenser as the second heat exchange device in a flow rate of 85,000 kg/hr. At the same time water with a state of 115.0° C., 0.7 kgf/cm²g and a gas volume fraction of 0.0 was introduced into the condenser in a flow rate of 10.000 kg/hr and heat exchanged with the refrigerant stream. After heat exchange water was discharged as steam with a state of 115.0° C., 0.7 kgf/cm²g and a gas volume fraction of 0.33, and the mixed refrigerant stream was condensed and effused in a state of 125° C., 20.7 kgf/cm²g (21.3 bar) and a gas volume fraction of 0.0, and introduced into the flow splitter.

The mixed refrigerant stream was divided in the flow splitter into the first, second and third refrigerant streams with a state of 125.0° C., 20.7 kgf/cm²g (21.3 bar) and a gas volume fraction of 0.00, respectively, which were depressurized by introducing the first refrigerant stream in a flow rate of 30,000 kg/hr into the first control valve, introducing the second refrigerant stream in a flow rate of 29,000 kg/hr into the second control valve and introducing the third refrigerant stream in a flow rate of 26,000 kg/hr into the third control valve.

The depressurized first refrigerant stream passing through the first control valve was effused in a state of 90.0° C., 9.3 kgf/cm²g (10.1 bar) and a gas volume fraction of 0.00 from the first control valve, and then re-introduced in a flow rate of 30,000 kg/hr into the first-first heat exchanger. In addition, the depressurized second refrigerant stream passing through the second control valve was effused in a state of 80.0° C., 7.1 kgf/cm²g (7.94 bar) and a gas volume fraction of 0.00 from the second control valve, and then re-introduced in a flow rate of 29,000 kg/hr into the first-second heat exchanger, and the depressurized third refrigerant stream passing through the third control valve was effused in a state of 70.0° C., 5.2 kgf/cm²g (6.1 bar) and a gas volume fraction of 0.00 from the third control valve, and then re-introduced in a flow rate of 26,000 kg/hr into the first-third heat exchanger.

In this case, the performance factor of the heat recovery apparatus was calculated by Formula 5 below and represented in Table 1 below. The performance factor represents the amount of heat absorbed by the heat exchange medium relative to energy input to the compressor, that is, means the rate of the recovered energy relative to the input of energy. For example, if the performance factor is 3, it means to obtain the amount of heat three times the input electricity.

$$COP = \frac{Q}{W} \quad \text{[Formula 5]}$$

In Formula 5 above, Q represents an amount of heat condensed by the condenser, and W represents the total amount of work done by the compressor.

Example 2

Steam was generated using the heat recovery apparatus of FIG. 9.

Three refrigerant (1,1,1,3,3-pentafluoropropane, R245fa) streams were circulated to sequentially pass through the first heat exchange device, the third heat exchange device, the compression device, the second heat exchange device, the third heat exchange device and at least two control valves. Specifically, the heat exchange was allowed by introducing the first refrigerant stream with a state of 90.0° C., 9.3 kgf/cm²g (10.1 bar) and a gas volume fraction of 0.0 into the first-first heat exchanger in a flow rate of 30,000 kg/hr and at the same time introducing the waste heat stream with a state of 110.0° C., 1.0 kgf/cm²g and a gas volume fraction of 0.0 into the first-first heat exchanger in a flow rate of 100,000 kg/hr. After the heat exchange the waste heat stream was effused in a state of 100.3° C., 1.0 kgf/cm²g and a gas volume fraction of 0.0 in a flow rate of 100,000 kg/hr from the first-first heat exchanger and the heat exchanged waste heat stream was introduced into the first-second heat exchanger. At the same time, the heat exchange was allowed by introducing the second refrigerant stream with a state of 80.0° C., 7.1 kgf/cm²g (7.94 bar) and a gas volume fraction of 0.0 into the first-second heat exchanger in a flow rate of 29,000 kg/hr. After the heat exchange the waste heat stream was effused in a state of 90.1° C., 1.0 kgf/cm²g and a gas volume fraction of 0.0 in a flow rate of 100,000 kg/hr from the first-second heat exchanger and the heat exchanged waste heat stream was introduced into the first-third heat exchanger. At the same time, the heat exchange was allowed by introducing the third refrigerant stream with a state of 70.0° C., 5.2 kgf/cm²g (6.1 bar) and a gas volume fraction of 0.0 into the first-third heat exchanger in a flow rate of 26,000 kg/hr. After the heat exchange the waste heat stream was effused in a state of 80.3° C., 1.0 kgf/cm²g and a gas volume fraction of 0.0 in a flow rate of 100,000 kg/hr from the first-third heat exchanger. Then, the first refrigerant stream flowing out after heat exchange in the first-first heat exchanger was introduced into the third-first heat exchanger, and the first refrigerant stream flowing out from the first-first heat exchanger and flowing into the third-first heat exchanger was effused from the third-first heat exchanger after heat exchange and then introduced into the first compressor. And, the second refrigerant stream flowing out after heat exchange in the first-second heat exchanger was introduced into the third-second heat exchanger, and the second refrigerant stream flowing out from the first-second heat exchanger and flowing into the third-second heat exchanger was effused from the third-second heat exchanger after heat exchange and introduced into the second compressor. In addition, the third refrigerant stream flowing out after heat exchange in the first-third heat exchanger was introduced into the third-third heat exchanger, and the third refrigerant stream flowing out from the first-third heat exchanger and flowing into the third-third heat exchanger was effused from the third-third heat exchanger after heat exchange and then introduced into the third compressor. In addition, the first, second and third refrigerant streams effused from the first, second and third compressors were introduced into a condenser as the second heat exchange device and heat exchanged with the fluid stream passing through the condenser, and the refrigerant stream effused from the condenser was again introduced into the third-first heat exchanger and heat exchanged with the first refrigerant stream flowing out from the first-first heat exchanger and flowing into the third-first heat exchanger and then introduced into the third-second heat exchanger. In addition, the refrigerant stream flowing out from the condenser and flowing out after heat exchange in the third-first heat exchanger was introduced into the third-second heat exchanger and heat exchanged with the second refrigerant stream flowing out from the first-second heat exchanger and flowing into the third-second heat exchanger and then introduced into the third-third heat exchanger. In addition, the refrigerant stream flowing out after being heat exchanged by passing through the third-first heat exchanger and the third-second heat exchanger in turn was heat exchanged with the third refrigerant stream flowing out from the first-third heat exchanger and flowing into the third-third heat exchanger and passed through the control valve. Specifically, the first refrigerant stream flowing out after heat exchange in the first-first heat exchanger was effused in a state of 90.0° C., 9.3 kgf/cm²g (10.1 bar) and a gas volume fraction of 1.0 and then introduced into the third-first heat exchanger, and the first refrigerant stream flowing out after heat exchange in the third-first heat exchanger was introduced in a state of 115.0° C., 9.3 kgf/cm²g (10.1 bar) and a gas volume fraction of 1.0 into the first compressor. In addition, the second refrigerant stream flowing out after heat exchange in the first-second heat exchanger was effused in a state of 80.1° C., 7.1 kgf/cm²g (7.94 bar) and a gas volume fraction of 1.0 and then introduced into the third-second heat exchanger, and the second refrigerant stream flowing out after heat exchange in the third-second heat exchanger was introduced in a state of 107.4° C., 7.1 kgf/cm²g (7.94 bar) and a gas volume fraction of 1.0 into the second compressor. The third refrigerant stream flowing out after heat exchange in the first-third heat exchanger was effused in a state of 70.3° C., 5.2 kgf/cm²g (6.1 bar) and a gas volume fraction of 1.0 and then introduced into the third-first heat exchanger, and the third refrigerant stream flowing out after heat exchange in the third-first heat exchanger was introduced in a state of 103.1° C., 5.2 kgf/cm²g (6.1 bar) and a gas volume fraction of 1.0 into the third compressor. Thereafter, the first refrigerant stream compressed in the first compressor was effused in a state of 133.5° C., 20.7 kgf/cm²g (21.3 bar) and a gas volume fraction of 1.00 from the first compressor, where the amount of work used in the first compressor was 160,677.0 W. The second refrigerant stream compressed in the second compressor was effused in a state of 131.8° C., 20.7 kgf/cm²g (21.3 bar) and a gas volume fraction of 1.00 from the second compressor, where the amount of work used in the second compressor was 203,121.0 W. In addition, the third refrigerant stream compressed in the third compressor was effused in a state of 133.7° C., 20.7 kgf/cm²g (21.3 bar) and a gas volume fraction of 1.00 from the third compressor, where the amount of work used in the third compressor was 228,863.0 W.

Thereafter, the first, second and third refrigerant streams flowing out from the first compressor, the second compressor and the third compressor, respectively were introduced into the flow mixer, mixed and the mixed refrigerant stream with a state of 133° C., 20.7 kgf/cm²g (21.3 bar) and a gas volume fraction of 1.00 was introduced into the condenser as the second heat exchange device in a flow rate of 85,000 kg/hr. At the same time water with a state of 115.0° C., 0.7 kgf/cm²g and a gas volume fraction of 0.0 was introduced into the condenser in a flow rate of 10.000 kg/hr and heat exchanged with the refrigerant stream. After the heat exchange water was discharged as steam with a state of 115.0° C., 0.7 kgf/cm²g and a gas volume fraction of 0.44, and the mixed refrigerant stream was condensed and effused in a state of 125° C., 20.7 kgf/cm²g (21.3 bar) and a gas volume fraction of 0.0, and introduced into the third-first heat exchanger. The mixed refrigerant stream was heat exchanged in the third-first heat exchanger with the first refrigerant stream flowing out from the first-first heat exchanger and flowing into the third-first heat exchanger, then discharged in a state of 121.4° C., 20.7 kgf/cm²g (21.3 bar) and a gas volume fraction of 0.00 from the third-first heat exchanger and introduced into the third-second heat exchanger, and the mixed refrigerant stream flowing into the third-second heat exchanger after being heat exchanged in the third-first heat exchanger was heat exchanged with the second refrigerant stream flowing out from the first-second heat exchanger and flowing into the third-second heat exchanger, then discharged in a state of 117.4° C., 20.7 kgf/cm²g (21.3 bar) and a gas volume fraction of 0.00 from the third-second heat exchanger and introduced into the third-third heat exchanger. In addition, the mixed refrigerant stream flowing into the third-third heat exchanger after heat exchange in the third-second heat exchanger was heat exchanged with the third refrigerant stream flowing out from the first-third heat exchanger and flowing into the third-third heat exchanger, then effused in a state of 113.0° C., 20.7 kgf/cm²g (21.3 bar) and a gas volume fraction of 0.00 from the third-third heat exchanger and then introduced into the flow splitter.

The mixed refrigerant stream was divided in the flow splitter into the first, second and third refrigerant streams with a state of 113° C., 20.7 kgf/cm²g (21.3 bar) and a gas volume fraction of 0.00, respectively, which were depressurized by introducing the first refrigerant stream in a flow rate of 30,000 kg/hr into the first control valve, introducing the second refrigerant stream in a flow rate of 29,000 kg/hr into the second control valve and introducing the third refrigerant stream in a flow rate of 26,000 kg/hr into the third control valve.

The depressurized first refrigerant stream passing through the first control valve was effused in a state of 90.0° C., 9.3 kgf/cm²g (10.1 bar) and a gas volume fraction of 0.00 from the first control valve, and then re-introduced in a flow rate of 30,000 kg/hr into the first-first heat exchanger. In addition, the depressurized second refrigerant stream passing through the second control valve was effused in a state of 80.0° C., 7.1 kgf/cm²g (7.94 bar) and a gas volume fraction of 0.00 from the second control valve, and then re-introduced in a flow rate of 29,000 kg/hr into the first-second heat exchanger, and the depressurized third refrigerant stream passing through the third control valve was effused in a state of 70.0° C., 5.2 kgf/cm²g (6.1 bar) and a gas volume fraction of 0.00 from the third control valve, and then re-introduced in a flow rate of 26,000 kg/hr into the first-third heat exchanger. In this case, the performance factor of the heat recovery apparatus was represented in Table 1 below.

Example 3

Steam was generated using the heat recovery apparatus of FIG. 8.

Two refrigerant (1,1,1,3,3-pentafluoropropane, R245fa) streams were circulated to sequentially pass through the first heat exchange device, the third heat exchange device, the compression device, the second heat exchange device, the third heat exchange device and at least two control valves. Specifically, the heat exchange was allowed by introducing the first refrigerant stream with a state of 90.0° C., 9.3 kgf/cm²g (10.1 bar) and a gas volume fraction of 0.0 into the first-first heat exchanger in a flow rate of 45,000 kg/hr and at the same time introducing the waste heat stream with a state of 110.0° C., 1.0 kgf/cm²g and a gas volume fraction of 0.0 into the first-first heat exchanger in a flow rate of 100,000 kg/hr. After the heat exchange the waste heat stream was effused in a state of 95.4° C., 1.0 kgf/cm²g and a gas volume fraction of 0.0 in a flow rate of 100,000 kg/hr from the first-first heat exchanger and the heat exchanged waste heat stream was introduced into the first-second heat exchanger. At the same time, the heat exchange was allowed by introducing the second refrigerant stream with a state of 70.0° C., 5.2 kgf/cm²g (6.1 bar) and a gas volume fraction of 0.0 into the first-second heat exchanger in a flow rate of 43,000 kg/hr. After the heat exchange the waste heat stream was effused in a state of 80.0° C., 1.0 kgf/cm²g and a gas volume fraction of 0.0 in a flow rate of 100,000 kg/hr from the first-second heat exchanger. Then, the first refrigerant stream flowing out after heat exchange in the first-first heat exchanger was introduced into the third-first heat exchanger, and the first refrigerant stream flowing out from the first-first heat exchanger and flowing into the third-first heat exchanger was effused from the third-first heat exchanger after heat exchange and then introduced into the first compressor. And, the second refrigerant stream flowing out after heat exchange in the first-second heat exchanger was introduced into the third-second heat exchanger, and the second refrigerant stream flowing out from the first-second heat exchanger and flowing into the third-second heat exchanger was effused from the third-second heat exchanger after heat exchange and introduced into the second compressor. In addition, the first and second refrigerant streams effused from the first and second compressors were introduced into a condenser as the second heat exchange device and heat exchanged with the fluid stream passing through the condenser, and the refrigerant stream effused from the condenser was again introduced into the third-first heat exchanger and heat exchanged with the first refrigerant stream flowing out from the first-first heat exchanger and flowing into the third-first heat exchanger and then introduced into the third-second heat exchanger. In addition, the refrigerant stream flowing out from the condenser and flowing out after heat exchange in the third-first heat exchanger was introduced into the third-second heat exchanger and heat exchanged with the second refrigerant stream flowing out from the first-second heat exchanger and flowing into the third-second heat exchanger and then passed through the control valve. Specifically, the first refrigerant stream flowing out after heat exchange in the first-first heat exchanger was effused in a state of 90.0° C., 9.3 kgf/cm²g (10.1 bar) and a gas volume fraction of 1.0 and then introduced into the third-first heat exchanger, and the first refrigerant stream flowing out after heat exchange in the third-first heat exchanger was introduced in a state of 115.0° C., 9.3 kgf/cm²g (10.1 bar) and a gas volume fraction of 1.0 into the first compressor. In addition, the second refrigerant stream flowing out after heat exchange in the first-second heat exchanger was effused in a state of 70.0° C., 5.2 kgf/cm²g (6.1 bar) and a gas volume fraction of 0.95 and then introduced into the third-second heat exchanger, and the second refrigerant stream flowing out after heat exchange in the third-second heat exchanger was introduced in a state of 101.3° C., 5.2 kgf/cm²g (6.1 bar) and a gas volume fraction of 1.0 into the second compressor. Thereafter, the first refrigerant stream compressed in the first compressor was effused in a state of 133.5° C., 20.7 kgf/ cm²g (21.3 bar) and a gas volume fraction of 1.00 from the first compressor, where the amount of work used in the first compressor was 241,006.0 W. The second refrigerant stream compressed in the second compressor was effused in a state of 131.9° C., 20.7 kgf/cm²g (21.3 bar) and a gas volume fraction of 1.00 from the second compressor, where the amount of work used in the second compressor was 376,775.0 W.

Thereafter, the first and second refrigerant streams flowing out from the first compressor and the second compressor, respectively were introduced into the flow mixer, mixed and the mixed refrigerant stream with a state of 132.7° C., 20.7 kgf/cm²g (21.3 bar) and a gas volume fraction of 1.00 was introduced into the condenser as the second heat exchange device in a flow rate of 88,000 kg/hr. At the same time water with a state of 115.0° C., 0.7 kgf/cm²g and a gas volume fraction of 0.0 was introduced into the condenser in a flow rate of 10.000 kg/hr and heat exchanged with the refrigerant stream. After the heat exchange water was discharged as steam with a state of 115.0° C., 0.7 kgf/cm²g and a gas volume fraction of 0.46, and the mixed refrigerant stream was condensed and effused in a state of 125° C., 20.7 kgf/cm²g (21.3 bar) and a gas volume fraction of 0.0, and then introduced into the third-first heat exchanger. The mixed refrigerant stream was heat exchanged in the third-first heat exchanger with the first refrigerant stream flowing out from the first-first heat exchanger and flowing into the third-first heat exchanger, then discharged in a state of 119.7° C., 20.7 kgf/cm²g (21.3 bar) and a gas volume fraction of 0.00 from the third-first heat exchanger and introduced into the third-second heat exchanger, and the mixed refrigerant stream flowing into the third-second heat exchanger after being heat exchanged in the third-first heat exchanger was heat exchanged with the second refrigerant stream flowing out from the first-second heat exchanger and flowing into the third-second heat exchanger, then effused in a state of 111.3° C., 20.7 kgf/cm²g (21.3 bar) and a gas volume fraction of 0.00 from the third-second heat exchanger and then introduced into the flow splitter.

The mixed refrigerant stream was divided in the flow splitter into the first and second refrigerant streams with a state of 113° C., 20.7 kgf/cm²g (21.3 bar) and a gas volume fraction of 0.00, respectively, which were depressurized by introducing the first refrigerant stream in a flow rate of 45,000 kg/hr into the first control valve and introducing the second refrigerant stream in a flow rate of 43,000 kg/hr into the second control valve.

The depressurized first refrigerant stream passing through the first control valve was effused in a state of 90.0° C., 9.3 kgf/cm²g (10.1 bar) and a gas volume fraction of 0.00 from the first control valve, and then re-introduced in a flow rate of 45,000 kg/hr into the first-first heat exchanger. In addition, the depressurized second refrigerant stream passing through the second control valve was effused in a state of 70.0° C., 5.2 kgf/cm²g (6.1 bar) and a gas volume fraction of 0.00 from the second control valve, and then re-introduced in a flow rate of 43,000 kg/hr into the first-second heat exchanger. In this case, the performance factor of the heat recovery apparatus was represented in Table 1 below.

Example 4

Steam was generated by the same method as in Example 2 except for varying the conditions as follows, where the performance factor was represented in Table 2 below.

The heat exchange was allowed by introducing the first refrigerant stream with a state of 85.0° C., 8.1 kgf/cm²g (8.92 bar) and a gas volume fraction of 0.0 into the first-first heat exchanger in a flow rate of 45,000 kg/hr and at the same time introducing the waste heat stream with a state of 110.0° C., 1.0 kgf/cm²g and a gas volume fraction of 0.0 into the first-first heat exchanger in a flow rate of 100,000 kg/hr. After the heat exchange the waste heat stream was effused in a state of 94.9° C., 1.0 kgf/cm²g and a gas volume fraction of 0.0 in a flow rate of 100,000 kg/hr from the first-first heat exchanger and the heat exchanged waste heat stream was introduced into the first-second heat exchanger. At the same time, the heat exchange was allowed by introducing the second refrigerant stream with a state of 80.0° C., 7.1 kgf/cm²g (7.94 bar) and a gas volume fraction of 0.0 into the first-second heat exchanger in a flow rate of 14,500 kg/hr. After the heat exchange the waste heat stream was effused in a state of 90.0° C., 1.0 kgf/cm²g and a gas volume fraction of 0.0 in a flow rate of 100,000 kg/hr from the first-second heat exchanger, and the heat exchanged waste heat stream was introduced into the first-third exchanger. At the same time, the heat exchange was allowed by introducing the third refrigerant stream with a state of 75.0° C., 6.1 kgf/cm²g (6.95 bar) and a gas volume fraction of 0.0 into the first-third heat exchanger in a flow rate of 20,000 kg/hr. After the heat exchange the waste heat stream was effused in a state of 85.0° C., 1.0 kgf/cm²g and a gas volume fraction of 0.0 in a flow rate of 100,000 kg/hr from the first-third heat exchanger. The first refrigerant stream flowing out after heat exchange in the first-first heat exchanger was effused in a state of 85.0° C., 8.1 kgf/cm²g (8.92 bar) and a gas volume fraction of 1.0, and then introduced into the third-first heat exchanger, and the first refrigerant stream flowing out after heat exchange in the third-first heat exchanger was introduced in a state of 115.0° C., 8.1 kgf/cm²g (8.92 bar) and a gas volume fraction of 1.0 into the first compressor. In addition, the second refrigerant stream flowing out after heat exchange in the first-second heat exchanger was effused in a state of 80.0° C., 7.1 kgf/cm²g (7.94 bar) and a gas volume fraction of 0.96 and then introduced into the third-second heat exchanger, and the second refrigerant stream flowing out after heat exchange in the third-second heat exchanger was introduced in a state of 105.4° C., 7.1 kgf/cm²g (7.94 bar) and a gas volume fraction of 1.0 into the second compressor. The third refrigerant stream flowing out after heat exchange in the first-third heat exchanger was effused in a state of 75.0° C., 6.1 kgf/cm²g (6.96 bar) and a gas volume fraction of 1.0 and then introduced into the third-first heat exchanger, and the third refrigerant stream flowing out after heat exchange in the third-first heat exchanger was introduced in a state of 97.0° C., 6.1 kgf/cm²g (6.96 bar) and a gas volume fraction of 1.0 into the third compressor. Thereafter, the first refrigerant stream compressed in the first compressor was effused in a state of 136.5° C., 20.7 kgf/cm²g (21.3 bar) and a gas volume fraction of 1.00 from the first compressor, where the amount of work used in the first compressor was 280,414.0 W. The second refrigerant stream compressed in the second compressor was effused in a state of 129.7° C., 20.7 kgf/cm²g (21.3 bar) and a gas volume fraction of 1.00 from the second compressor, where the amount of work used in the second compressor was 101,026.0 W. In addition, the third refrigerant stream compressed in the third compressor was effused in a state of 125.0° C., 20.7 kgf/cm²g (21.3 bar) and a gas volume fraction of 0.99 from the third compressor, where the amount of work used in the third compressor was 154,381.0 W.

Thereafter, the first, second and third refrigerant streams flowing out from the first compressor, the second compressor and the third compressor, respectively were introduced into the flow mixer, mixed and the mixed refrigerant stream with a state of 132.2° C., 20.7 kgf/cm²g (21.3 bar) and a gas volume fraction of 1.00 was introduced into the condenser as the second heat exchange device in a flow rate of 79,500 kg/hr. At the same time water with a state of 115.0° C., 0.7 kgf/cm²g and a gas volume fraction of 0.0 was introduced into the condenser in a flow rate of 10.000 kg/hr and heat exchanged with the refrigerant stream. After the heat exchange water was discharged as steam with a state of 115.0° C., 0.7 kgf/cm²g and a gas volume fraction of 0.41, and the mixed refrigerant stream was condensed and effused in a state of 125° C., 20.7 kgf/cm²g (21.3 bar) and a gas volume fraction of 0.0, and introduced into the third-first heat exchanger. The mixed refrigerant stream was heat exchanged in the third-first heat exchanger with the first refrigerant stream flowing out from the first-first heat exchanger and flowing into the third-first heat exchanger, then discharged in a state of 117.0° C., 20.7 kgf/cm²g (21.3 bar) and a gas volume fraction of 0.00 from the third-first heat exchanger and introduced into the third-second heat exchanger, and the mixed refrigerant stream flowing into the third-second heat exchanger after being heat exchanged in the third-first heat exchanger was heat exchanged with the second refrigerant stream flowing out from the first-second heat exchanger and flowing into the third-second heat exchanger, then discharged in a state of 115.4° C., 20.7 kgf/cm²g (21.3 bar) and a gas volume fraction of 0.00 from the third-second heat exchanger and introduced into the third-third heat exchanger. In addition, the mixed refrigerant stream flowing into the third-third heat exchanger after heat exchange in the third-second heat exchanger was heat exchanged with the third refrigerant stream flowing out from the first-third heat exchanger and flowing into the third-third heat exchanger, then effused in a state of 107.0° C., 20.7 kgf/cm²g (21.3 bar) and a gas volume fraction of 0.00 from the third-third heat exchanger and then introduced into the flow splitter.

The mixed refrigerant stream was divided in the flow splitter into the first, second and third refrigerant streams with a state of 107.0° C., 20.7 kgf/cm²g (21.3 bar) and a gas volume fraction of 0.00, respectively, which were depressurized by introducing the first refrigerant stream in a flow rate of 45,000 kg/hr into the first control valve, introducing the second refrigerant stream in a flow rate of 14,500 kg/hr into the second control valve and introducing the third refrigerant stream in a flow rate of 20,000 kg/hr into the third control valve.

The depressurized first refrigerant stream passing through the first control valve was effused in a state of 85.0° C., 8.1 kgf/cm²g (8.92 bar) and a gas volume fraction of 0.00 from the first control valve, and then re-introduced in a flow rate of 45,000 kg/hr into the first-first heat exchanger. In addition, the depressurized second refrigerant stream passing through the second control valve was effused in a state of 80.0° C., 7.1 kgf/cm²g (7.94 bar) and a gas volume fraction of 0.00 from the second control valve, and then re-introduced in a flow rate of 14,500 kg/hr into the first-second heat exchanger, and the depressurized third refrigerant stream passing through the third control valve was effused in a state of 75.0° C., 6.1 kgf/cm²g (6.96 bar) and a gas volume fraction of 0.00 from the third control valve, and then re-introduced in a flow rate of 20,000 kg/hr into the first-third heat exchanger.

Example 5

Steam was generated by the same method as in Example 2 except for varying the conditions as follows, where the performance factor was represented in Table 2 below.

The heat exchange was allowed by introducing the first refrigerant stream with a state of 85.0° C., 8.1 kgf/cm²g (8.92 bar) and a gas volume fraction of 0.0 into the first-first heat exchanger in a flow rate of 30,000 kg/hr and at the same time introducing the waste heat stream with a state of 110.0° C., 1.0 kgf/cm²g and a gas volume fraction of 0.0 into the first-first heat exchanger in a flow rate of 200,000 kg/hr. After the heat exchange the waste heat stream was effused in a state of 94.9° C., 1.0 kgf/cm²g and a gas volume fraction of 0.0 in a flow rate of 200,000 kg/hr from the first-first heat exchanger and the heat exchanged waste heat stream was introduced into the first-second heat exchanger. At the same time, the heat exchange was allowed by introducing the second refrigerant stream with a state of 80.0° C., 7.1 kgf/cm²g (7.94 bar) and a gas volume fraction of 0.0 into the first-second heat exchanger in a flow rate of 29,000 kg/hr. After the heat exchange the waste heat stream was effused in a state of 90.0° C., 1.0 kgf/cm²g and a gas volume fraction of 0.0 in a flow rate of 200,000 kg/hr from the first-second heat exchanger, and the heat exchanged waste heat stream was introduced into the first-third exchanger. At the same time, the heat exchange was allowed by introducing the third refrigerant stream with a state of 77.5° C., 6.6 kgf/cm²g (7.45 bar) and a gas volume fraction of 0.0 into the first-third heat exchanger in a flow rate of 13,000 kg/hr. After the heat exchange the waste heat stream was effused in a state of 87.7° C., 1.0 kgf/cm²g and a gas volume fraction of 0.0 in a flow rate of 200,000 kg/hr from the first-third heat exchanger. The first refrigerant stream flowing out after heat exchange in the first-first heat exchanger was effused in a state of 85.0° C., 8.1 kgf/cm²g (8.92 bar) and a gas volume fraction of 1.0, and then introduced into the third-first heat exchanger, and the first refrigerant stream flowing out after heat exchange in the third-first heat exchanger was introduced in a state of 115.0° C., 8.1 kgf/cm²g (8.92 bar) and a gas volume fraction of 1.0 into the first compressor. In addition, the second refrigerant stream flowing out after heat exchange in the first-second heat exchanger was effused in a state of 80.0° C., 7.1 kgf/cm²g (7.94 bar) and a gas volume fraction of 0.96 and then introduced into the third-second heat exchanger, and the second refrigerant stream flowing out after heat exchange in the third-second heat exchanger was introduced in a state of 104.4° C., 7.1 kgf/cm²g (7.94 bar) and a gas volume fraction of 1.0 into the second compressor. The third refrigerant stream flowing out after heat exchange in the first-third heat exchanger was effused in a state of 77.5° C., 6.6 kgf/cm²g (7.45 bar) and a gas volume fraction of 1.0 and then introduced into the third-first heat exchanger, and the third refrigerant stream flowing out after heat exchange in the third-first heat exchanger was introduced in a state of 102.4° C., 6.6 kgf/cm²g (7.45 bar) and a gas volume fraction of 1.0 into the third compressor. Thereafter, the first refrigerant stream compressed in the first compressor was effused in a state of 136.5° C., 20.7 kgf/cm²g (21.3 bar) and a gas volume fraction of 1.00 from the first compressor, where the amount of work used in the first compressor was 186,943.0 W. The second refrigerant stream compressed in the second compressor was effused in a state of 128.7° C., 20.7 kgf/cm²g (21.3 bar) and a gas volume fraction of 1.00 from the second compressor, where the amount of work used in the second compressor was 201,548.0 W. In addition, the third refrigerant stream compressed in the third compressor was effused in a state of 128.2° C., 20.7 kgf/cm²g (21.3 bar) and a gas volume fraction of 1.00 from the third compressor, where the amount of work used in the third compressor was 95,781.0 W.

Thereafter, the first, second and third refrigerant streams flowing out from the first compressor, the second compressor and the third compressor, respectively were introduced into the flow mixer, mixed and the mixed refrigerant stream with a state of 131.9° C., 20.7 kgf/cm$^2$g (21.3 bar) and a gas volume fraction of 1.00 was introduced into the condenser as the second heat exchange device in a flow rate of 72,000 kg/hr. At the same time water with a state of 115.0° C., 0.7 kgf/cm$^2$g and a gas volume fraction of 0.0 was introduced into the condenser in a flow rate of 10.000 kg/hr and heat exchanged with the refrigerant stream. After the heat exchange water was discharged as steam with a state of 115.0° C., 0.7 kgf/cm$^2$g and a gas volume fraction of 0.37, and the mixed refrigerant stream was condensed and effused in a state of 125° C., 20.7 kgf/cm$^2$g (21.3 bar) and a gas volume fraction of 0.0, and introduced into the third-first heat exchanger. The mixed refrigerant stream was heat exchanged in the third-first heat exchanger with the first refrigerant stream flowing out from the first-first heat exchanger and flowing into the third-first heat exchanger, then discharged in a state of 119.0° C., 20.7 kgf/cm$^2$g (21.3 bar) and a gas volume fraction of 0.00 from the third-first heat exchanger and introduced into the third-second heat exchanger, and the mixed refrigerant stream flowing into the third-second heat exchanger after being heat exchanged in the third-first heat exchanger was heat exchanged with the second refrigerant stream flowing out from the first-second heat exchanger and flowing into the third-second heat exchanger, then discharged in a state of 114.4° C., 20.7 kgf/cm$^2$g (21.3 bar) and a gas volume fraction of 0.00 from the third-second heat exchanger and introduced into the third-third heat exchanger. In addition, the mixed refrigerant stream flowing into the third-third heat exchanger after heat exchange in the third-second heat exchanger was heat exchanged with the third refrigerant stream flowing out from the first-third heat exchanger and flowing into the third-third heat exchanger, then effused in a state of 112.4° C., 20.7 kgf/cm$^2$g (21.3 bar) and a gas volume fraction of 0.00 from the third-third heat exchanger and then introduced into the flow splitter.

The mixed refrigerant stream was divided in the flow splitter into the first, second and third refrigerant streams with a state of 112.4° C., 20.7 kgf/cm$^2$g (21.3 bar) and a gas volume fraction of 0.00, respectively, which were depressurized by introducing the first refrigerant stream in a flow rate of 30,000 kg/hr into the first control valve, introducing the second refrigerant stream in a flow rate of 29,000 kg/hr into the second control valve and introducing the third refrigerant stream in a flow rate of 13,000 kg/hr into the third control valve.

The depressurized first refrigerant stream passing through the first control valve was effused in a state of 85.0° C., 8.1 kgf/cm$^2$g (8.92 bar) and a gas volume fraction of 0.00 from the first control valve, and then re-introduced in a flow rate of 30,000 kg/hr into the first-first heat exchanger. In addition, the depressurized second refrigerant stream passing through the second control valve was effused in a state of 80.0° C., 7.1 kgf/cm$^2$g (7.94 bar) and a gas volume fraction of 0.00 from the second control valve, and then re-introduced in a flow rate of 29,000 kg/hr into the first-second heat exchanger, and the depressurized third refrigerant stream passing through the third control valve was effused in a state of 77.5° C., 6.6 kgf/cm$^2$g (7.45 bar) and a gas volume fraction of 0.00 from the third control valve, and then re-introduced in a flow rate of 13,000 kg/hr into the first-third heat exchanger.

Comparative Example 1

Steam was generated using the heat recovery apparatus of FIG. 11.

The refrigerant (1,1,1,3,3-pentafluoropropane, R245fa) was circulated in the same flow rate of 81,000 kg/hr to sequentially pass through the first heat exchanger, the compressor, the second heat exchanger and the control valve. Specifically, the heat exchange was allowed by introducing the refrigerant stream with a state of 70.0° C., 5.2 kgf/cm$^2$g (6.1 bar) and a gas volume fraction of 0.0 into the first heat exchanger and at the same time introducing the waste heat stream with a state of 110.0° C., 1.0 kgf/cm$^2$g and a gas volume fraction of 0.0 into the first heat exchanger in a flow rate of 100,000 kg/hr. After the heat exchange the waste heat stream was effused in a state of 80.0° C., 1.0 kgf/cm$^2$g and a gas volume fraction of 0.0 in a flow rate of 100,000 kg/hr, and the refrigerant stream was effused in a state of 70.0° C., 5.2 kgf/cm$^2$g (6.1 bar) and a gas volume fraction of 1.0, and then compressed by introducing it into the compressor. The refrigerant stream compressed in the compressor was effused in a state of 125.0° C., 20.7 kgf/cm$^2$g (21.3 bar) and a gas volume fraction of 0.75 from the compressor. In this case, the amount of work used in the compressor was 629,387.0 W. The refrigerant stream flowing out from the compressor was introduced into the second heat exchanger, and at the same time water with a state of 115.0° C., 0.7 kgf/cm$^2$g and a gas volume fraction of 0.0 was introduced in a flow rate of 10,000 kg/hr and heat exchanged with the refrigerant stream. After the heat exchange water was discharged as steam with a state of 115.0° C., 0.7 kgf/cm$^2$g and a gas volume fraction of 0.29, and the condensed refrigerant stream was effused in a state of 125.0° C., 20.7 kgf/cm$^2$g (21.3 bar) and a gas volume fraction of 0.0 and then introduced into the control valve. The refrigerant stream flowing into the control valve was effused in a state of 70.0° C., 5.2 kgf/cm$^2$g (6.1 bar) and a gas volume fraction of 0.0 and then introduced into the first heat exchanger.

In this case, the performance factor of the heat recovery apparatus was represented in Table 3 below.

Comparative Example 2

Steam was generated using the heat recovery apparatus of FIG. 12.

The refrigerant (1,1,1,3,3-pentafluoropropane, R245fa) was circulated in the same flow rate of 81,000 kg/hr to sequentially pass through the first heat exchanger, the third heat exchanger, the compressor, the second heat exchanger, the third heat exchanger and the control valve. Specifically, the heat exchange was allowed by introducing the refrigerant stream with a state of 70.0° C., 5.2 kgf/cm$^2$g (6.1 bar) and a gas volume fraction of 0.0 into the first heat exchanger and at the same time introducing the waste heat stream with a state of 110.0° C., 1.0 kgf/cm$^2$g and a gas volume fraction of 0.0 into the first heat exchanger in a flow rate of 100,000 kg/hr. After the heat exchange the waste heat stream was effused in a state of 80.0° C., 1.0 kgf/cm$^2$g and a gas volume fraction of 0.0 in a flow rate of 100,000 kg/hr, and the refrigerant stream was effused in a state of 70.0° C., 5.2 kgf/cm$^2$g (6.1 bar) and a gas volume fraction of 1.0, and then introduced into the third heat exchanger. The refrigerant stream flowing out from the first heat exchanger and flowing into the third heat exchanger was introduced into the second heat exchanger and heat exchanged with the fluid stream passing through the second heat exchanger, and the refrigerant stream effused in the second heat exchanger was again introduced into the third heat exchanger, heat exchanged with the refrigerant stream flowing out from the first heat exchanger and flowing into the third heat exchanger, and then passed through the control valve. Specifically, the refrigerant stream heat exchanged in the third heat exchanger was effused in a state of 115.0° C., 5.2 kgf/cm²g (6.1 bar) and a gas volume fraction of 0.0 from the third heat exchanger, and then introduced into the compressor. In addition, the refrigerant stream compressed in the compressor was effused in a state of 146.0° C., 20.7 kgf/cm²g (21.3 bar) and a gas volume fraction of 1.0 from the compressor. In this case, the amount of work used in the compressor was 735,139.0 W. The refrigerant stream flowing out from the compressor was introduced into the second heat exchanger, and at the same time water with a state of 115.0° C., 0.7 kgf/cm²g and a gas volume fraction of 0.0 was introduced in a flow rate of 10,000 kg/hr and heat exchanged with the refrigerant stream. After the heat exchange water was discharged as steam with a state of 115.0° C., 0.7 kgf/cm²g and a gas volume fraction of 0.47, and the condensed refrigerant stream was effused in a state of 125.0° C., 20.7 kgf/cm²g (21.3 bar) and a gas volume fraction of 0.0 and then introduced into the third heat exchanger. The refrigerant stream condensed after being heat exchanged in the second heat exchanger and flowing into the third heat exchanger was heat exchanged with the refrigerant stream flowing out from the first heat exchanger and flowing into the third heat exchanger, and then effused in a state of 105.3° C., 20.7 kgf/cm²g (21.3 bar) and a gas volume fraction of 0.0 from the third heat exchanger, and introduced into the control valve. The refrigerant stream flowing into the control valve was effused in a state of 70.0° C., 5.2 kgf/cm²g (6.1 bar) and a gas volume fraction of 0.0 and then introduced into the first heat exchanger.

In this case, the performance factor of the heat recovery apparatus was represented in Table 3 below.

TABLE 1

|  | Example 1 | Example 2 | Example 3 |
|---|---|---|---|
| $T_{F1}$(° C.)   $T_{R1}$(° C.) | 110.0   90.0 | 110.0   90.0 | 110.0   90.0 |
| $T_{F1} - T_{R1}$(° C.) | 20.0 | 20.0 | 20.0 |
| $P_{C1}$(bar)   $P_{H1}$(bar) | 21.3   10.1 | 21.3   10.1 | 21.3   10.1 |
| $P_{C1}/P_{H1}$ | 2.1 | 2.1 | 2.1 |
| $T_{R3Hin}$(° C.)   $T_{R3Cout}$(° C.) | —   — | 125.0   115.0 | 125.0   115.0 |
| $T_{R3Hin} - T_{R3Cout}$(° C.) | n/a | 10.0 | 10.0 |
| Q(W) | 2,009,300.0 | 2,727,930.0 | 2,817,820.0 |
| Total W(W) | 532,327.0 | 592,661.0 | 617,781.0 |
| COP | 3.77 | 4.60 | 4.56 | n/a: not available

TABLE 2

|  | Example 4 | Example 5 |
|---|---|---|
| $T_{F1}$(° C.)   $T_{R1}$(° C.) | 110.0   85.0 | 110.0   85.0 |
| $T_{F1} - T_{R1}$(° C.) | 25.0 | 25.0 |
| $P_{C1}$(bar)   $P_{H1}$(bar) | 21.3   8.92 | 21.3   8.92 |
| $P_{C1}/P_{H1}$ | 2.4 | 2.4 |
| $T_{R3Hin}$(° C.)   $T_{R3Cout}$(° C.) | 125.0   115.0 | 125.0   115.0 |
| $T_{R3Hin} - T_{R3Cout}$(° C.) | 10.0 | 10.0 |
| Q(W) | 2,541,894.8 | 2,290,520.0 |
| Total W(W) | 535,821.0 | 484,272.0 |
| COP | 4.74 | 4.73 |

TABLE 3

|  | Comparative Example 1 | Comparative Example 2 |
|---|---|---|
| $T_{F1}$(° C.)   $T_{R1}$(° C.) | 110.0   70.0 | 110.0   70.0 |
| $T_{F1} - T_{R1}$(° C.) | 40.0 | 40.0 |
| $P_{C1}$(bar)   $P_{H1}$(bar) | 21.3   6.1 | 21.3   6.1 |
| $P_{C1}/P_{H1}$ | 3.5 | 3.5 |
| $T_{R3Hin}$(° C.)   $T_{R3Cout}$(° C.) | n/a   n/a | 125.0   115.0 |
| $T_{R3Hin} - T_{R3Cout}$(° C.) | n/a | 10.0 |
| Q(W) | 1,807,740.0 | 2,913,630.0 |
| Total W(W) | 629,387.0 | 735,139.0 |
| COP | 2.87 | 3.96 |

The invention claimed is:

1. A heat recovery apparatus comprising a first heat exchange device, a compression device, a second heat exchange device and at least two pressure drop devices, which are fluidically connected through pipes that refrigerants flow,
    wherein at least two refrigerant streams including a first refrigerant stream and a second refrigerant stream flow into said first heat exchange device,
    said first refrigerant stream flowing into said first heat exchange device is heat exchanged with a first fluid stream flowing into said first heat exchange device, and said first fluid stream heat exchanged with said first refrigerant stream is heat exchanged with said second refrigerant stream,
    the at least two refrigerant streams including the first and second refrigerant streams flowing out from said first heat exchange device flow into said compression device,
    the at least two refrigerant streams including the first and second refrigerant streams flowing out from said compression device flow into said second heat exchange device,
    the at least two refrigerant streams including the first and second refrigerant streams flowing into said second heat exchange device are heat exchanged with a second fluid stream flowing into said second heat exchange device, the at least two refrigerant streams including the first and second refrigerant streams flowing out from said second heat exchange device flow into said at least two pressure drop devices, respectively, the at least two refrigerant streams including the first refrigerant stream and the second refrigerant stream, flowing out from said at least two pressure drop devices, respectively, flow into said first heat exchange device, wherein the first heat exchange device comprises at least two heat exchangers, the compression device comprises at least two compressors, the second heat exchange device composes of only one heat exchanger, and the pressure drop device is a control valve or a turbine, wherein the first heat exchange device comprises a first-first heat exchanger and a first-second heat exchanger, the compression device comprises a first compressor and a second compressor, and the pressure drop device comprises a first pressure drop device and a second pressure drop device, and wherein the first fluid stream flows into said first-first heat exchanger and the first fluid stream flowing out from said first-first heat exchanger flows into said first-second heat exchanger, the first refrigerant stream flows into said first-first heat exchanger and the second refrigerant stream flows into said first-second heat exchanger, the first refrigerant stream flowing into said first-first heat exchanger is heat exchanged with the first fluid stream flowing into said first-first heat exchanger and the second refrigerant stream flowing into said first-second heat exchanger is heat exchanged with the first fluid stream flowing out from said first-first heat exchanger and flowing into said first-second heat exchanger, the first refrigerant stream flowing out from said first-first heat exchanger flows into said first compressor and the second refrigerant stream flowing out from said second heat exchange device flows into said second compressor, the first refrigerant stream flowing out from said first compressor and the second refrigerant stream flowing out from said second compressor flow into said second heat exchange device, the first and second refrigerant streams flowing into said second heat exchange device are heat exchanged with the second fluid stream flowing into said second heat exchange device, and the first refrigerant stream flowing out from said second heat exchange device flows into said first pressure drop device and the second refrigerant stream flowing out from said second heat exchange device flows into said second pressure drop device, and the first refrigerant stream flowing out from said first pressure drop device flows into said first-first heat exchanger and the second refrigerant stream flowing out from said second pressure drop device flows into said first-second heat exchanger.

2. The heat recovery apparatus according to claim 1, wherein the temperature of the first refrigerant stream flowing out from the first heat exchange device and the temperature of the first fluid stream flowing into said first heat exchange device satisfy Formula 1 below:

$$1° C. \leq T_{F1} - T_{R1} \leq 35° C.$$ [Formula 1]

wherein, $T_{F1}$ represents the temperature of the first fluid stream flowing into the first heat exchange device and $T_{R1}$ represents the temperature of the first refrigerant stream flowing out from the first heat exchange device.

3. The heat recovery apparatus according to claim 1, wherein the ratio of the pressure of the first refrigerant stream flowing out from the compression device to the pressure of the first refrigerant stream flowing out from the first heat exchange device and flowing into the compression device satisfies Formula 2 below:

$$2 \leq P_{C1}/P_{H1} \leq 6$$ [Formula 2]

wherein, $P_{C1}$ represents the pressure (bar) of the first refrigerant stream flowing out from the compression device and $P_{H1}$ represents the pressure (bar) of the refrigerant stream flowing out from the first heat exchange device and flowing into the compression device.

4. The heat recovery apparatus according to claim 1, further comprising a flow mixer, wherein the at least two refrigerant streams including the first and second refrigerant streams flowing out from the compression device are introduced into said flow mixer, mixed and then introduced into said second heat exchange device, and the mixed refrigerant stream flowing into said second heat exchange device is heat exchanged with the second fluid stream flowing into said heat exchange device.

5. The heat recovery apparatus according to claim 4, further comprising a flow splitter, wherein the mixed refrigerant stream flowing out from the second heat exchange device flows into said flow splitter, and the refrigerant stream flowing into said flow splitter is divided into at least two refrigerant streams including said first and second refrigerant streams and then introduced into at least two pressure drop devices, respectively.

6. The heat recovery apparatus according to claim 1, wherein the first heat exchange device comprises a first-first heat exchanger, a first-second heat exchanger and a first-third heat exchanger, the compression device comprises a first compressor, a second compressor and a third compressor, and the pressure drop device comprises a first pressure drop device, a second pressure drop device and a third pressure drop device, and wherein the first fluid stream flows into said first-first heat exchanger, the first fluid stream flowing out from said first-first heat exchanger flows into said first-second heat exchanger and the first fluid stream flowing out from said first-second heat exchanger flows into said first-third heat exchanger, the first refrigerant stream flows into said first-first heat exchanger, the second refrigerant stream flows into said first-second heat exchanger and the third refrigerant stream flows into said first-third heat exchanger, the first refrigerant stream flowing into said first-first heat exchanger is heat exchanged with the first fluid stream flowing into said first-first heat exchanger, the second refrigerant stream flowing into said first-second heat exchanger is heat exchanged with the first fluid stream flowing out from said first-first heat exchanger and flowing into said first-second heat exchanger and the third refrigerant stream flowing into said first-third heat exchanger is heat exchanged with the first fluid stream flowing out from said first-second heat exchanger and flowing into said first-third heat exchanger, the first refrigerant stream flowing out from said first-first heat exchanger flows into said first compressor, the second refrigerant stream flowing out from said first-second heat exchanger flows into said second compressor and the third refrigerant stream flowing out from said first-third heat exchange device flows into said third compressor, the first refrigerant stream flowing out from said first compressor, the second refrigerant stream flowing out from said second compressor and the third refrigerant stream flowing out from said third compressor flow into said second heat exchange device, the first, second and third refrigerant streams flowing into said second heat exchange device are heat exchanged with the second fluid stream flowing into said second heat exchange device, and the first refrigerant stream flowing out from said second heat exchange device flows into said first pressure drop device, the second refrigerant stream flowing out from said second heat exchange device flows into said second pressure drop device and the third refrigerant stream flowing out from said second heat exchange device flows into said third pressure drop device, and the first refrigerant stream flowing out from said first pressure drop device flows into said first-first heat exchanger, the second refrigerant stream flowing out from said second pressure drop device flows into said first-second heat exchanger and the third refrigerant stream flowing out from said third pressure drop device flows into said first-third heat exchanger.

7. The heat recovery apparatus according to claim 1, wherein the first heat exchange device comprises a first-first heat exchanger, a first-second heat exchanger, a first-third heat exchanger and a first-fourth heat exchanger, the compression device comprises a first compressor, a second compressor, a third compressor and a fourth compressor, and the pressure drop device comprises a first pressure drop device, a second pressure drop device, a third pressure drop device and a fourth pressure drop device, and wherein the first fluid stream flows into said first-first heat exchanger, the first fluid stream flowing out from said first-first heat exchanger flows into said first-second heat exchanger, the first fluid stream flowing out from said first-second heat exchanger flows into said first-third heat exchanger and the first fluid stream flowing out from said first-third heat exchanger flows into said first-fourth heat exchanger, the first refrigerant stream flows into said first-first heat exchanger, the second refrigerant stream flows into said first-second heat exchanger, the third refrigerant stream flows into said first-third heat exchanger and the fourth refrigerant stream flows into said first-fourth heat exchanger, the first refrigerant stream flowing into said first-first heat exchanger is heat exchanged with the first fluid stream flowing into said first-first heat exchanger, the second refrigerant stream flowing into said first-second heat exchanger is heat exchanged with the first fluid stream flowing out from said first-first heat exchanger and flowing into said first-second heat exchanger, the third refrigerant stream flowing into said first-third heat exchanger is heat exchanged with the first fluid stream flowing out from said first-second heat exchanger and flowing into said first-third heat exchanger and the fourth refrigerant stream flowing into said first-fourth heat exchanger is heat exchanged with the first fluid stream flowing out from said first-third heat exchanger and flowing into said first-fourth heat exchanger, the first refrigerant stream flowing out from said first-first heat exchanger flows into said first compressor, the second refrigerant stream flowing out from said first-second heat exchanger flows into said second compressor, the third refrigerant stream flowing out from said first-third heat exchange device flows into said third compressor and the fourth refrigerant stream flowing out from said first-fourth heat exchange device flows into said fourth compressor, the first refrigerant stream flowing out from said first compressor, the second refrigerant stream flowing out from said second compressor, the third refrigerant stream flowing out from said third compressor and the fourth refrigerant stream flowing out from said fourth compressor flow into said second heat exchange device, the first, second, third and fourth refrigerant streams flowing into said second heat exchange device are heat exchanged with the second fluid stream flowing into said second heat exchange device, and the first refrigerant stream flowing out from said second heat exchange device flows into said first pressure drop device, the second refrigerant stream flowing out from said second heat exchange device flows into said second pressure drop device, the third refrigerant stream flowing out from said second heat exchange device flows into said third pressure drop device and the fourth refrigerant stream flowing out from said second heat exchange device flows into said fourth pressure drop device, and the first refrigerant stream flowing out from said first pressure drop device flows into said first-first heat exchanger, the second refrigerant stream flowing out from said second pressure drop device flows into said first-second heat exchanger, the third refrigerant stream flowing out from said third pressure drop device flows into said first-third heat exchanger and the fourth refrigerant stream flowing out from said fourth pressure drop device flows into said first-fourth heat exchanger.

8. The heat recovery apparatus according to claim 1, wherein the refrigerant is a refrigerant having a positive slope of the tangent line of the saturated vapor curve in the temperature-entropy diagram.

9. The heat recovery apparatus according to claim 8, wherein the slope of the tangent line of the saturated vapor curve in the temperature-entropy diagram is 1 to 3 at 50° C. to 130° C.

10. The heat recovery apparatus according to claim 8, wherein the refrigerant is one or more selected from the group consisting of R245fa, R1234ze and R1234yf.

11. The heat recovery apparatus according to claim 8, further comprising a third heat exchange device, wherein the at least two refrigerant streams including the first and second refrigerant streams flowing out from the first heat exchange device flow into said third heat exchange device and then introduced into the compression device, the at least two refrigerant streams including the first and second refrigerant streams flowing out from the second heat exchange device flow into said third heat exchange device and then introduced into the pressure drop device, and the at least two refrigerant streams flowing out from said first heat exchange device and the at least two refrigerant streams flowing out from said second heat exchange device are heat exchanged in said third heat exchange device.

12. The heat recovery apparatus according to claim 11, wherein the first refrigerant stream flowing out from the first heat exchange device and the first refrigerant stream flowing out from the second heat exchange device are heat exchanged in the third heat exchange device, and the second refrigerant stream flowing out from the first heat exchange device and the second refrigerant stream flowing out from the second heat exchange device are heat exchanged in the third heat exchange device.

13. The heat recovery apparatus according to claim 11, further comprising a flow mixer and a flow splitter, wherein
the at least two refrigerant streams including the first and second refrigerant streams flowing out from the compression device is introduced into said flow mixer, mixed and then introduced into said second heat exchange device,
the mixed refrigerant stream flowing into said second heat exchange device is heat exchanged with the second fluid stream flowing into the second heat exchange device,
the mixed refrigerant stream flowing out from said second heat exchange device flows into said third heat exchange device and then introduced into said flow splitter,
the refrigerant stream flowing into said flow splitter is divided into at least two refrigerant streams including the first and second refrigerant streams, and then introduced into at least two pressure drop devices, respectively,
the first refrigerant stream flowing out from said first heat exchange device and the mixed refrigerant stream flowing out from said second heat exchange device are heat exchanged in said third heat exchange device, and
the second refrigerant stream flowing out from said first heat exchange device and the mixed refrigerant stream heat exchanged with said first refrigerant stream are heat exchanged in said third heat exchange device.

14. The heat recovery apparatus according to claim 13, wherein the temperature of the first refrigerant stream flowing out from the third heat exchange device and flowing into the compression device and the temperature of the mixed refrigerant stream flowing out from the second heat exchange device and flowing into said third heat exchange device satisfy Formula 3 below:

$$1° C. \leq T_{R3Hin} - T_{R3Cout} \leq 30° C. \quad \text{[Formula 3]}$$

wherein, $T_{R3Cout}$ represents the temperature of the first refrigerant stream flowing out from the third heat exchange device and flowing into the compression device and $T_{R3Hin}$ represents the temperature of the mixed refrigerant stream flowing out from the second heat exchange device and flowing into said third heat exchange device.

15. The heat recovery apparatus according to claim 13, wherein the first heat exchange device and the third heat exchange device comprise at least two heat exchangers and the compression device comprises at least at least two compressors.

16. The heat recovery apparatus according to claim 15, wherein the first heat exchange device comprises a first-first heat exchanger and a first-second heat exchanger, the third heat exchange device comprises a third-first heat exchanger and a third-second heat exchanger, the compression device comprises a first compressor and a second compressor, and the pressure drop device comprises a first pressure drop device and a second pressure drop device, and wherein
the first fluid stream flows into said first-first heat exchanger and the first fluid stream flowing out from said first-first heat exchanger flows into said first-second heat exchanger,
the first refrigerant stream flows into said first-first heat exchanger and the second refrigerant stream flows into said first-second heat exchanger,
the first refrigerant stream flowing into said first-first heat exchanger is heat exchanged with the first fluid stream flowing into said first-first heat exchanger and the second refrigerant stream flowing into said first-second heat exchanger is heat exchanged with the first fluid stream flowing out from said first-first heat exchanger and flowing into said first-second heat exchanger,
the first refrigerant stream flowing out from said first-first heat exchanger flows into said third-first heat exchanger and then introduced into said first compressor, and the second refrigerant stream flowing out from said first-second heat exchanger flows into said third-second heat exchanger and then introduced into said second compressor,
the first refrigerant stream flowing out from said first compressor and the second refrigerant stream flowing out from said second compressor are introduced into the flow mixer, mixed and then introduced into said second heat exchange device,
the mixed refrigerant stream flowing into said second heat exchange device is heat exchanged with the second fluid stream flowing into said second heat exchange device, the mixed refrigerant stream flowing out from said second heat exchange device flows into said third-first heat exchanger, the mixed refrigerant stream flowing out from said third-first heat exchanger flows into said third-second heat exchanger and the mixed refrigerant stream flowing out from said third-second heat exchanger flows into the flow splitter,
the mixed refrigerant stream flowing into said flow splitter is divided in said flow splitter into said first refrigerant stream and second refrigerant stream,
the first refrigerant stream divided in said flow splitter flows into said first pressure drop device and the second refrigerant stream divided in said flow splitter flows into said second pressure drop device,
the first refrigerant stream flowing out from said first pressure drop device flows into said first-first heat exchanger and the second refrigerant stream flowing out from said second pressure drop device flows into said first-second heat exchanger, and
the first refrigerant stream flowing out said first-first heat exchanger and the mixed refrigerant stream flowing out from said second heat exchange device are heat exchanged in said third-first heat exchanger and the second refrigerant stream flowing out said first-second heat exchanger and the mixed refrigerant stream flowing out from said third-first heat exchanger are heat exchanged in said third-second heat exchanger.

17. The heat recovery apparatus according to claim 15, wherein the first heat exchange device comprises a first-first heat exchanger, a first-second heat exchanger and a first-third heat exchanger, the third heat exchange device comprises a third-first heat exchanger, a third-second heat exchanger and a third-third heat exchanger, the compression device comprises a first compressor, a second compressor and a third compressor, and the pressure drop device comprises a first pressure drop device, a second pressure drop device and a third pressure drop device, and wherein the first fluid stream flows into said first-first heat exchanger, the first fluid stream flowing out from said first-first heat exchanger flows into said first-second heat exchanger and the first fluid stream flowing out from said first-second heat exchanger flows into said first-third heat exchanger, the first refrigerant stream flows into said first-first heat exchanger, the second refrigerant stream flows into said first-second heat exchanger and the third refrigerant stream flows into said first-third heat exchanger, the first refrigerant stream flowing into said first-first heat exchanger is heat exchanged with the first fluid stream flowing into said first-first heat exchanger, the second refrigerant stream flowing into said first-second heat exchanger is heat exchanged with the first fluid stream flowing out from said first-first heat exchanger and flowing into said first-second heat exchanger and the third refrigerant stream flowing into said first-third heat exchanger is heat exchanged with the first fluid stream flowing out from said first-second heat exchanger and flowing into said first-third heat exchanger, the first refrigerant stream flowing out from said first-first heat exchanger flows into said third-first heat exchanger and then introduced into said first compressor, the second refrigerant stream flowing out from said first-second heat exchanger flows into said third-second heat exchanger and then introduced into said second compressor, and the third refrigerant stream flowing out from said first-third heat exchanger flows into said third-third heat exchanger and then introduced into said third compressor, the first refrigerant stream flowing out from said first compressor, the second refrigerant stream flowing out from said second compressor and the third refrigerant stream flowing out from said third compressor are introduced into the flow mixer, combined and then introduced into said second heat exchange device, the mixed refrigerant stream flowing into said second heat exchange device is heat exchanged with the second fluid stream flowing into said second heat exchange device, the mixed refrigerant stream flowing out from said second heat exchange device flows into said third-first heat exchanger, the mixed refrigerant stream flowing out from said third-first heat exchanger flows into said third-second heat exchanger, the mixed refrigerant stream flowing out from said third-second heat exchanger flows into said third-third heat exchanger and the mixed refrigerant stream flowing out from said third-third heat exchanger flows into the flow splitter, the mixed refrigerant stream flowing into said flow splitter is divided in said flow splitter into said first refrigerant stream, second refrigerant stream and third refrigerant stream, the first refrigerant stream divided in said flow splitter flows into said first pressure drop device, the second refrigerant stream divided in said flow splitter flows into said second pressure drop device and the third refrigerant stream divided in said flow splitter flows into said third pressure drop device, the first refrigerant stream flowing out from said first pressure drop device flows into said first-first heat exchanger, the second refrigerant stream flowing out from said second pressure drop device flows into said first-second heat exchanger and the third refrigerant stream flowing out from said third pressure drop device flows into said first-third heat exchanger, and the first refrigerant stream flowing out said first-first heat exchanger and the mixed refrigerant stream flowing out from said second heat exchange device are heat exchanged in said third-first heat exchanger, the second refrigerant stream flowing out said first-second heat exchanger and the mixed refrigerant stream flowing out from said third-first heat exchanger are heat exchanged in said third-second heat exchanger and the third refrigerant stream flowing out said first-third heat exchanger and the mixed refrigerant stream flowing out from said third-second heat exchanger are heat exchanged in said third-third heat exchanger.

18. The heat recovery apparatus according to claim 15, wherein the first heat exchange device comprises a first-first heat exchanger, a first-second heat exchanger, a first-third heat exchanger and a first-fourth heat exchanger, the third heat exchange device comprises a third-first heat exchanger, a third-second heat exchanger, a third-third heat exchanger and a third-fourth heat exchanger, the compression device comprises a first compressor, a second compressor, a third compressor and a fourth compressor, and the pressure drop device comprises a first pressure drop device, a second pressure drop device, a third pressure drop device and a fourth pressure drop device, and wherein the first fluid stream flows into said first-first heat exchanger, the first fluid stream flowing out from said first-first heat exchanger flows into said first-second heat exchanger, the first fluid stream flowing out from said first-second heat exchanger flows into said first-third heat exchanger and the first fluid stream flowing out from said first-third heat exchanger flows into said first-fourth heat exchanger, the first refrigerant stream flows into said first-first heat exchanger, the second refrigerant stream flows into said first-second heat exchanger, the third refrigerant stream flows into said first-third heat exchanger and the fourth refrigerant stream flows into said first-fourth heat exchanger, the first refrigerant stream flowing into said first-first heat exchanger is heat exchanged with the first fluid stream flowing into said first-first heat exchanger, the second refrigerant stream flowing into said first-second heat exchanger is heat exchanged with the first fluid stream flowing out from said first-first heat exchanger and flowing into said first-second heat exchanger, the third refrigerant stream flowing into said first-third heat exchanger is heat exchanged with the first fluid stream flowing out from said first-second heat exchanger and flowing into said first-third heat exchanger and the fourth refrigerant stream flowing into said first-fourth heat exchanger is heat exchanged with the first fluid stream flowing out from said first-third heat exchanger and flowing into said first-fourth heat exchanger, the first refrigerant stream flowing out from said first-first heat exchanger flows into said third-first heat exchanger and then introduced into said first compressor, the second refrigerant stream flowing out from said first-second heat exchanger flows into said third-second heat exchanger and then introduced into said second compressor, the third refrigerant stream flowing out from said first-third heat exchanger flows into said third-third heat exchanger and then introduced into said third compressor, and the fourth refrigerant stream flowing out from said first-fourth heat exchanger flows into said third-fourth heat exchanger and then introduced into said fourth compressor, the first refrigerant stream flowing out from said first compressor, the second refrigerant stream flowing out from said second compressor, the third refrigerant stream flowing out from said third compressor and the fourth refrigerant stream flowing out from said fourth compressor are introduced into the flow mixer, mixed and then introduced into said second heat exchange device, the mixed refrigerant stream flowing into said second heat exchange device is heat exchanged with the second fluid stream flowing into said second heat exchange device, the mixed refrigerant stream flowing out from said second heat exchange device flows into said third-first heat exchanger, the mixed refrigerant stream flowing out from said third-first heat exchanger flows into said third-second heat exchanger, the mixed refrigerant stream flowing out from said third-second heat exchanger flows into said third-third heat exchanger, the mixed refrigerant stream flowing out from said third-third heat exchanger flows into said third-fourth heat exchanger and the mixed refrigerant stream flowing out from said third-fourth heat exchanger flows into the flow splitter, the mixed refrigerant stream flowing into said flow splitter is divided in said flow splitter into said first refrigerant stream, second refrigerant stream, third refrigerant stream and fourth refrigerant stream, the first refrigerant stream divided in said flow splitter flows into said first pressure drop device, the second refrigerant stream divided in said flow splitter flows into said second pressure drop device, the third refrigerant stream divided in said flow splitter flows into said third pressure drop device and the fourth refrigerant stream divided in said flow splitter flows into said fourth pressure drop device, the first refrigerant stream flowing out from said first pressure drop device flows into said first-first heat exchanger, the second refrigerant stream flowing out from said second pressure drop device flows into said first-second heat exchanger, the third refrigerant stream flowing out from said third pressure drop device flows into said first-third heat exchanger and the fourth refrigerant stream flowing out from said fourth pressure drop device flows into said first-fourth heat exchanger, and the first refrigerant stream flowing out said first-first heat exchanger and the mixed refrigerant stream flowing out from said first-second heat exchanger are heat exchanged in said third-first heat exchanger, the second refrigerant stream flowing out said first-second heat exchanger and the mixed refrigerant stream flowing out from said third-first heat exchanger are heat exchanged in said third-second heat exchanger, the third refrigerant stream flowing out said first-third heat exchanger and the mixed refrigerant stream flowing out from said third-second heat exchanger are heat exchanged in said third-third heat exchanger and the fourth refrigerant stream flowing out said first-fourth heat exchanger and the mixed refrigerant stream flowing out from said third-third heat exchanger are heat exchanged in said third-fourth heat exchanger.

19. A heat recovery method with the heat recovery apparatus according to claim 1 comprising a refrigerant circulation step which comprises introducing at least two refrigerant streams including a first refrigerant stream and a second refrigerant stream into a first heat exchange device, introducing the at least two refrigerant streams flowing out from said first heat exchange device into a compression device, mixing the at least two refrigerant streams including the first and second refrigerant streams flowing out from said compression device and then introducing the mixed refrigerant stream into a second heat exchange device, introducing the mixed refrigerant stream flowing out from said second heat exchange device into a pressure drop device, dividing the refrigerant stream flowing out from said pressure drop device into at least two refrigerant streams including said first refrigerant stream and second refrigerant stream, and introducing at least two refrigerant streams including said divided first refrigerant stream and second refrigerant stream into said first heat exchange device;

a first heat exchange step which comprises heat exchanging the first refrigerant stream flowing into said first heat exchange device with the first fluid stream flowing into said first heat exchange device;

a second heat exchange step which comprises heat exchanging said first fluid stream heat exchanged with said first refrigerant stream, with the second refrigerant stream flowing into said first heat exchange device; and a third heat exchange step of heat exchanging the mixed refrigerant stream flowing into said second heat exchange device with the second fluid stream flowing into said second heat exchange device.

20. The heat recovery method according to claim 19, wherein the temperature of the first refrigerant stream flowing out from the first heat exchange device and the temperature of the fluid stream flowing into said first heat exchange device satisfy Formula 1 below:

$$1° C. \leq T_{F1} - T_{R1} \leq 35° C. \quad \text{[Formula 1]}$$

wherein, $T_{F1}$ represents the temperature of the first fluid stream flowing into the first heat exchange device and $T_{R1}$ represents the temperature of the first refrigerant stream flowing out from the first heat exchange device.

21. The heat recovery method according to claim 19, wherein the ratio of the pressure of the first refrigerant stream flowing out from the compression device to the pressure of the first refrigerant stream flowing out from the first heat exchange device and flowing into the compression device satisfies Formula 2 below:

$$2 \leq P_{C1}/P_{H1} \leq 6 \quad \text{[Formula 2]}$$

wherein, $P_{C1}$ represents the pressure (bar) of the first refrigerant stream flowing out from the compression device and $P_{H1}$ represents the pressure (bar) of the refrigerant stream flowing out from the first heat exchange device and flowing into the compression device.

22. The heat recovery method according to claim 19, wherein the refrigerant is a refrigerant having a positive slope of the tangent line of the saturated vapor curve in the temperature-entropy diagram.

23. The heat recovery method according to claim 22, wherein the slope of the tangent line of the saturated vapor curve in the temperature-entropy diagram is 1 to 3 at 50° C. to 130° C.

24. The heat recovery method according to claim 22, wherein the refrigerant circulation step further comprises introducing at least two refrigerant streams flowing out from the first heat exchange device into the compression device after being introduced into the third heat exchange device, and introducing the mixed refrigerant stream flowing out from the second heat exchange device into the pressure drop device after being introduced into the third heat exchange device; and which further comprises
- a fourth heat exchange step of heat exchanging the mixed refrigerant stream flowing out from said second heat exchange device with the first refrigerant stream flowing out from said first heat exchange device in said third heat exchange device; and
- a fifth heat exchange step of heat exchanging the second refrigerant stream flowing out said first heat exchange device with the mixed refrigerant stream heat exchanged with said first refrigerant stream in said third heat exchange device.

25. The heat recovery method according to claim 24, wherein the temperature of the first refrigerant stream flowing out from the third heat exchange device and flowing into the compression device and the temperature of the mixed refrigerant stream flowing out from the second heat exchange device and flowing into said third heat exchange device satisfy Formula 3 below:

$$1° C. \leq T_{R3Hin} - T_{R3Cout} \leq 30° C. \qquad \text{[Formula 3]}$$

wherein, $T_{R3Cout}$ represents the temperature of the first refrigerant stream flowing out from the third heat exchange device and flowing into the compression device and $T_{R3Hin}$ represents the temperature of the mixed refrigerant stream flowing out from the second heat exchange device and flowing into said third heat exchange device.

26. The heat recovery method according to claim 19, wherein the second fluid flowing into the second heat exchange device is water.

27. The heat recovery method according to claim 26, further comprising a steam generation step of discharging the water heat exchanged with the refrigerant stream flowing into the second heat exchange device, as steam.

* * * * *